US012660022B2

(12) United States Patent
Lee et al.

(10) Patent No.: US 12,660,022 B2
(45) Date of Patent: Jun. 16, 2026

(54) ELECTRONIC DEVICE FOR PROVIDING DUAL CONNECTIVITY AND METHOD FOR OPERATING THEREOF

(71) Applicant: Samsung Electronics Co., Ltd., Suwon-si (KR)

(72) Inventors: Jiyeon Lee, Suwon-si (KR); Shinduck Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 614 days.

(21) Appl. No.: 18/157,536

(22) Filed: Jan. 20, 2023

(65) Prior Publication Data

US 2023/0239946 A1    Jul. 27, 2023

Related U.S. Application Data

(63) Continuation of application No. PCT/KR2023/001025, filed on Jan. 20, 2023.

(30) Foreign Application Priority Data

Jan. 24, 2022    (KR) ........................ 10-2022-0010279

(51) Int. Cl.
*H04W 76/15* (2018.01)
*H04L 5/00* (2006.01)
(Continued)

(52) U.S. Cl.
CPC ........... *H04W 76/15* (2018.02); *H04L 5/0055* (2013.01); *H04W 72/1268* (2013.01); *H04W 36/00698* (2023.05)

(58) Field of Classification Search
None
See application file for complete search history.

(56) References Cited

U.S. PATENT DOCUMENTS 11,363,495 B1 *  6/2022  Marupaduga ..... H04W 28/0933
2010/0260097 A1  10/2010  Ulupinar et al.
(Continued)

FOREIGN PATENT DOCUMENTS

JP        2015/142302 A     8/2015
JP     WO2016/021662 A1    4/2017
(Continued)

OTHER PUBLICATIONS

Nokia, Nokia Shanghai Bell; "UL Data Split," R3-213473, 3GPP TSGRAN WG3 Meeting #111-e, E-Meeting, Aug. 16-27, 2021.
(Continued)

*Primary Examiner* — Steve R Young
(74) *Attorney, Agent, or Firm* — Jefferson IP Law, LLP

(57) ABSTRACT

An electronic device is provided. The electronic device includes at least one processor, and the at least one processor be configured to establish a first connection based on a first radio access technology (RAT) with a first network and a second connection based on a second RAT with a second network, identify uplink data, based on a condition that associates the uplink data with an acknowledgment (ACK) or a negative acknowledgment (NACK) corresponding to downlink data from the first network and/or the second network being satisfied, transmit the uplink data corresponding to the ACK or the NACK, based on a RAT among the first RAT or the second RAT, regardless of whether a size of the uplink data is larger than or equal to a threshold set regard to the dual connectivity, and based on the condition not being satisfied, transmit the uplink data, based on a RAT corresponding to a primary path among the first RAT or the second RAT, according to whether the size of the uplink data is larger than or equal to the threshold, or transmit the uplink data using both the first RAT and the second RAT.

20 Claims, 16 Drawing Sheets

(51) Int. Cl.
H04W 36/00 (2009.01)
H04W 72/1268 (2023.01)

(56) References Cited

U.S. PATENT DOCUMENTS

| | | | | |
|---|---|---|---|---|
| 2016/0044639 | A1 | 2/2016 | Yi et al. | |
| 2016/0255537 | A1* | 9/2016 | Uchino | H04W 72/21 |
| | | | | 370/329 |
| 2016/0269943 | A1* | 9/2016 | Ji | H04L 1/1867 |
| 2017/0171905 | A1 | 6/2017 | Uchino et al. | |
| 2018/0098355 | A1* | 4/2018 | Islam | H04W 74/0808 |
| 2018/0227960 | A1 | 8/2018 | Belghoul | |
| 2019/0132897 | A1 | 5/2019 | Pradas et al. | |
| 2019/0149184 | A1 | 5/2019 | Jung et al. | |
| 2020/0022097 | A1 | 1/2020 | Wang et al. | |
| 2020/0128622 | A1 | 4/2020 | Song et al. | |
| 2020/0196211 | A1* | 6/2020 | Lu | H04W 76/15 |
| 2020/0367301 | A1 | 11/2020 | Kim et al. | |
| 2020/0413286 | A1 | 12/2020 | Yi et al. | |
| 2021/0022032 | A1* | 1/2021 | Kim | H04W 28/0252 |
| 2021/0022171 | A1* | 1/2021 | Zacharias | G01S 19/12 |
| 2021/0105841 | A1 | 4/2021 | Kim et al. | |
| 2021/0185747 | A1* | 6/2021 | Kanamarlapudi | H04L 1/08 |
| 2021/0329528 | A1* | 10/2021 | Kang | H04L 47/283 |
| 2021/0337424 | A1 | 10/2021 | Basu Mallick et al. | |
| 2021/0345454 | A1 | 11/2021 | Dhanapal et al. | |
| 2021/0368580 | A1* | 11/2021 | Wu | H04W 72/04 |
| 2022/0279537 | A1* | 9/2022 | Freda | H04W 72/569 |
| 2023/0097437 | A1 | 3/2023 | Chung et al. | |

FOREIGN PATENT DOCUMENTS

| | | | |
|---|---|---|---|
| KR | 10-2019-0039928 | A | 4/2019 |
| KR | 10-2019-0053761 | A | 5/2019 |
| KR | 10-2020-0043615 | A | 4/2020 |
| KR | 10-2020-0046372 | A | 5/2020 |
| KR | 10-2020-0132606 | A | 11/2020 |
| KR | 10-2021-0015101 | A | 2/2021 |
| KR | 10-2021-0041766 | A | 4/2021 |
| KR | 10-2021-0102749 | A | 8/2021 |
| WO | 2021/195822 | A1 | 10/2021 |

OTHER PUBLICATIONS

International Search Report and written opinion dated Apr. 11, 2023, issued in International Application No. PCT/KR2023/001025.
Extended European Search Report dated Jan. 29, 2025; European Appln. No. 23743531.8-1215 / 4412300 PCT/KR2023001025.

* cited by examiner

300a

CORE NETWORK ~330

310

MASTER NODE

320

SECONDARY NODE

ELECTRONIC DEVICE ~101

- - - - - CONTROL PLANE
———— USER PLANE

ELECTRONIC DEVICE FOR PROVIDING DUAL CONNECTIVITY AND METHOD FOR OPERATING THEREOF

CROSS-REFERENCE TO RELATED APPLICATION(S)

This application is a continuation application, claiming priority under § 365(c), of an International application No. PCT/KR2023/001025, filed on Jan. 20, 2023, which is based on and claims the benefit of a Korean patent application number 10-2022-0010279, filed on Jan. 24, 2022, in the Korean Intellectual Property Office, the disclosure of which is incorporated by reference herein in its entirety.

TECHNICAL FIELD

The disclosure relates to an electronic device configured to support dual connectivity and a method for operating the same.

BACKGROUND ART

In line with recent development of mobile communication technologies, use of portable terminals having various functions has become widespread, and efforts have been made to develop 5th generation (5G) communication systems in order to satisfy increasing wireless data traffic demands. It has been considered to implement 5G communication systems also in super-high-frequency bands, in addition to high-frequency bands used for 3rd generation (3G) and long term evolution (LTE), such that data can be transmitted at higher speeds, in order to accomplish higher data transmission rates.

Schemes considered to implement 5G communication include a standalone (SA) scheme and a non-standalone (NSA) scheme. The NSA scheme includes an evolved-universal terrestrial radio access (E-UTRA) new radio (NR) dual connectivity (EN-DC) scheme in which a new radio (NR) system is used together with an existing LTE system. According to the NSA scheme, user equipment may use not only an evolved node B (eNB) of the LTE system, but also a gNodeB (gNB) of the NR system. A technology that enables user equipment to use different types of communication systems may be referred to as dual connectivity.

Dual connectivity has been initially proposed by 3rd generation partnership project (3GPP) release-12. According to the initially proposed dual connectivity, 3.5 gigahertz (GHz) frequency bands are used as small cells, in addition to LTE systems. In connection with the EN-DC scheme, there has been ongoing discussion to implement the dual connectivity proposed by 3GPP release-12 such that LTE network communication is used as a master node, and NR network communication is used as a secondary node.

User equipment (UE) may receive, from the master node, a message (for example, radio resource control (RRC) connection reconfiguration message) instructing the same to report at least one parameter corresponding to a neighbor cell. The UE may measure at least one parameter of a signal from a base station of the neighbor cell and may report the same to the master node. The master node may determine to add a specific base station as a secondary node (SN), and may instruct the UE to add a secondary cell group. The UE may transmit/receive data with the network, based on two types of network communication. UE supporting the EN-DC may simultaneously support LTE communication and 5G communication, may transmit/receive control plane data and user plane data through LTE communication, for example, and may transmit/receive user plane data through 5G communication.

The above information is presented as background information only to assist with an understanding of the disclosure. No determination has been made, and no assertion is made, as to whether any of the above might be applicable as prior art with regard to the disclosure.

DETAILED DESCRIPTION OF THE INVENTION

Technical Problem

In order to increase the uplink data transmission rate, a split bearer may be configured in connection with the uplink by UE. When the split bearer is configured, the UE may transmit uplink data to the network by using two radio access technologies (RATs). Meanwhile, when the UE transmit an acknowledgement (ACK) message or negative acknowledgement (NACK) message related to downlink data to the network, there is a possibility that the ACK message or NACK message will be transmitted to the network based on the split bearer. When the ACK message or NACK message is transmitted to the network based on the split bearer, the network may combine and then process received messages based on the two RATs. As a result, processing of the ACK message or NACK message may be delayed.

Aspects of the disclosure are to address at least the above-mentioned problems and/or disadvantages and to provide at least the advantages described below. Accordingly, an aspect of the disclosure is to provide an electronic device and a method for operating the same, according to an embodiment, may transmit uplink data through only one path among dual connectivity (DC) when a condition that associates uplink data with an ACK message or NACK message is satisfied.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes at least one processor, and the at least one processor may be configured to establish a first connection based on a first radio access technology (RAT) with a first network and a second connection based on a second RAT with a second network, identify uplink data, based on a condition that associates the uplink data with an ACK or a NACK corresponding to downlink data from the first network or the second network being satisfied, transmit the uplink data corresponding to the ACK or the NACK, based on a RAT among the first RAT or the second RAT, regardless of whether a size of the uplink data is larger than or equal to a threshold set with regard to the dual connectivity, and based on the condition not being satisfied, transmit the uplink data, based on a RAT corresponding to a primary path among the first RAT or the second RAT, according to whether the size of the uplink data is larger than or equal to the threshold, or transmit the uplink data using both the first RAT and the second RAT.

In accordance with another aspect of the disclosure, a method for operating an electronic device is provided. The method includes establishing a first connection based on a first radio access technology (RAT) with a first network and a second connection based on a second RAT with a second network, identifying uplink data, based on a condition that associates the uplink data with an ACK or a NACK corresponding to downlink data from the first network or the second network being satisfied, transmitting the uplink data corresponding to the ACK or the NACK, based on a RAT among the first RAT or the second RAT, regardless of whether a size of the uplink data is larger than or equal to a threshold set with regard to the dual connectivity, and based on the condition not being satisfied, transmitting the uplink data, based on a RAT corresponding to a primary path among the first RAT or the second RAT, according to whether the size of the uplink data is larger than or equal to the threshold, or transmitting the uplink data using both the first RAT and the second RAT.

In accordance with another aspect of the disclosure, an electronic device is provided. The electronic device includes at least one processor, and the at least one processor may be configured to establish a first connection based on a first radio access technology (RAT) with a first network and a second connection based on a second RAT with a second network, the first connection and the second connection constituting dual connectivity, identify uplink data, based on the uplink data being of a first type, transmit the uplink data, based on a RAT among the first RAT or the second RAT, regardless of whether a size of the uplink data is larger than or equal to a threshold set with regard to the dual connectivity, and based on the uplink data not being of the first type, transmit the uplink data, based on a RAT corresponding to a primary path among the first RAT or the second RAT, according to whether the size of the uplink data is larger than or equal to the threshold, or transmit the uplink data using both the first RAT and the second RAT.

Advantageous Effects

An embodiment may provide an electronic device and a method for operating the same, wherein when a condition that associates uplink data with an ACK message or NACK message is satisfied, the uplink data may be transmitted through only one path among DC.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numerals are used to depict the same or similar elements, features, and structures.

MODE FOR CARRYING OUT THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
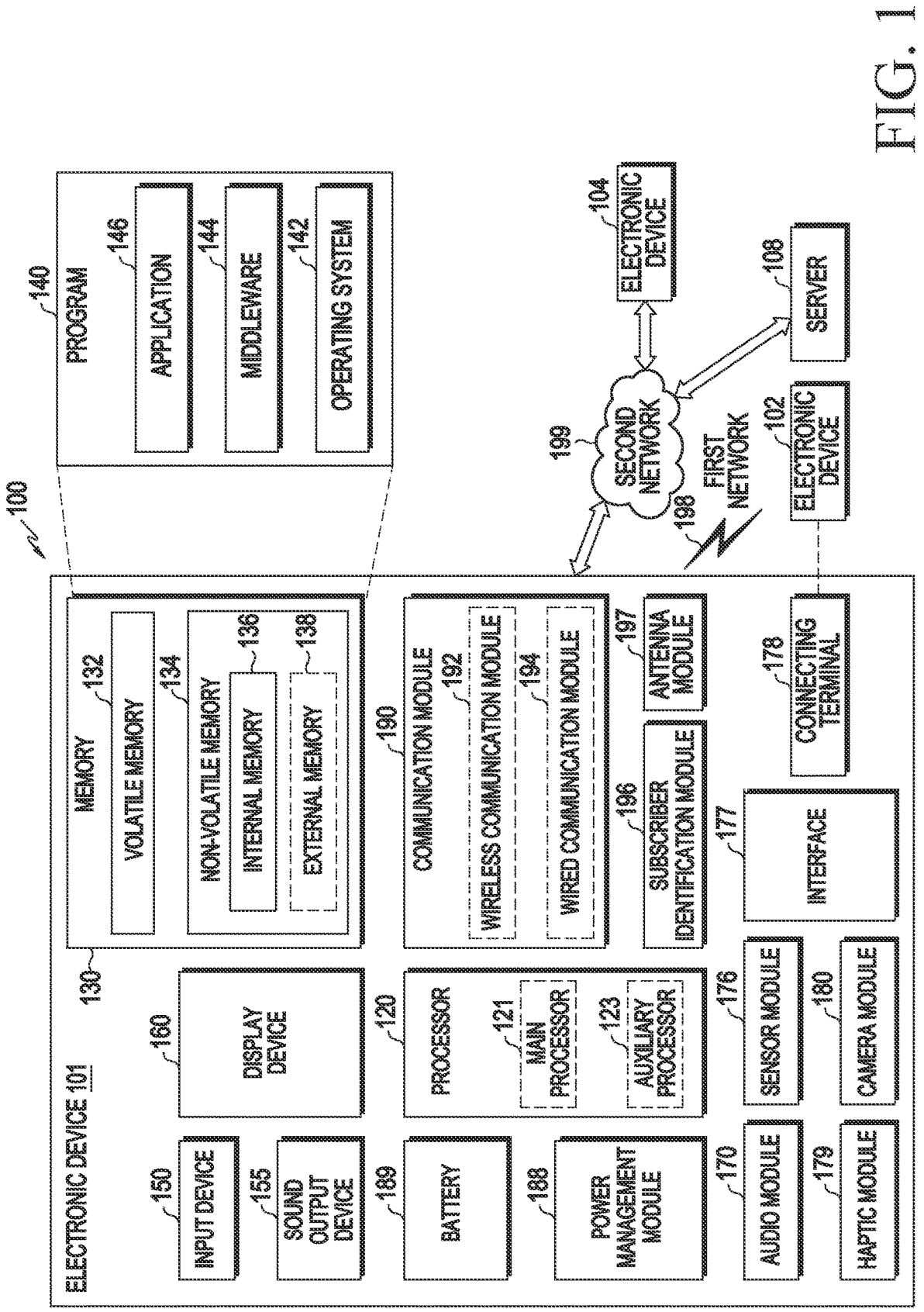
FIG. 1 is a block diagram illustrating an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence model is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network

199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4th generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 gigabits per second (Gbps) or more) for implementing eMBB, loss coverage (e.g., 164 database (dB) or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102 or 104, or server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
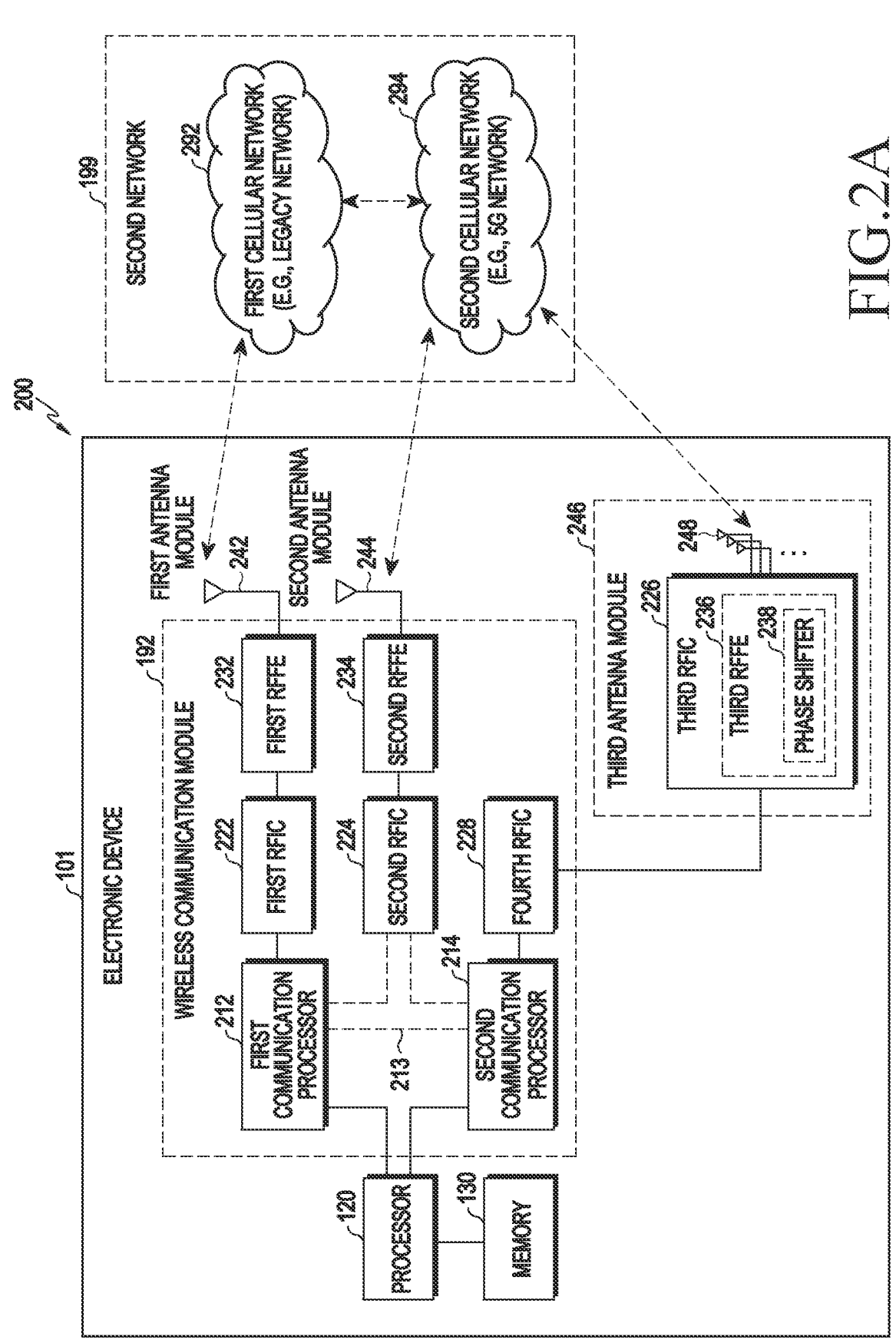
FIG. 2A is a block diagram of an electronic device for supporting legacy network communication and 5G network communication according to an embodiment of the disclosure.

FIG. 2A is a block diagram 200 of an electronic device 101 for supporting legacy network communication and 5G network communication according to an embodiment of the disclosure.

Figure 2B:
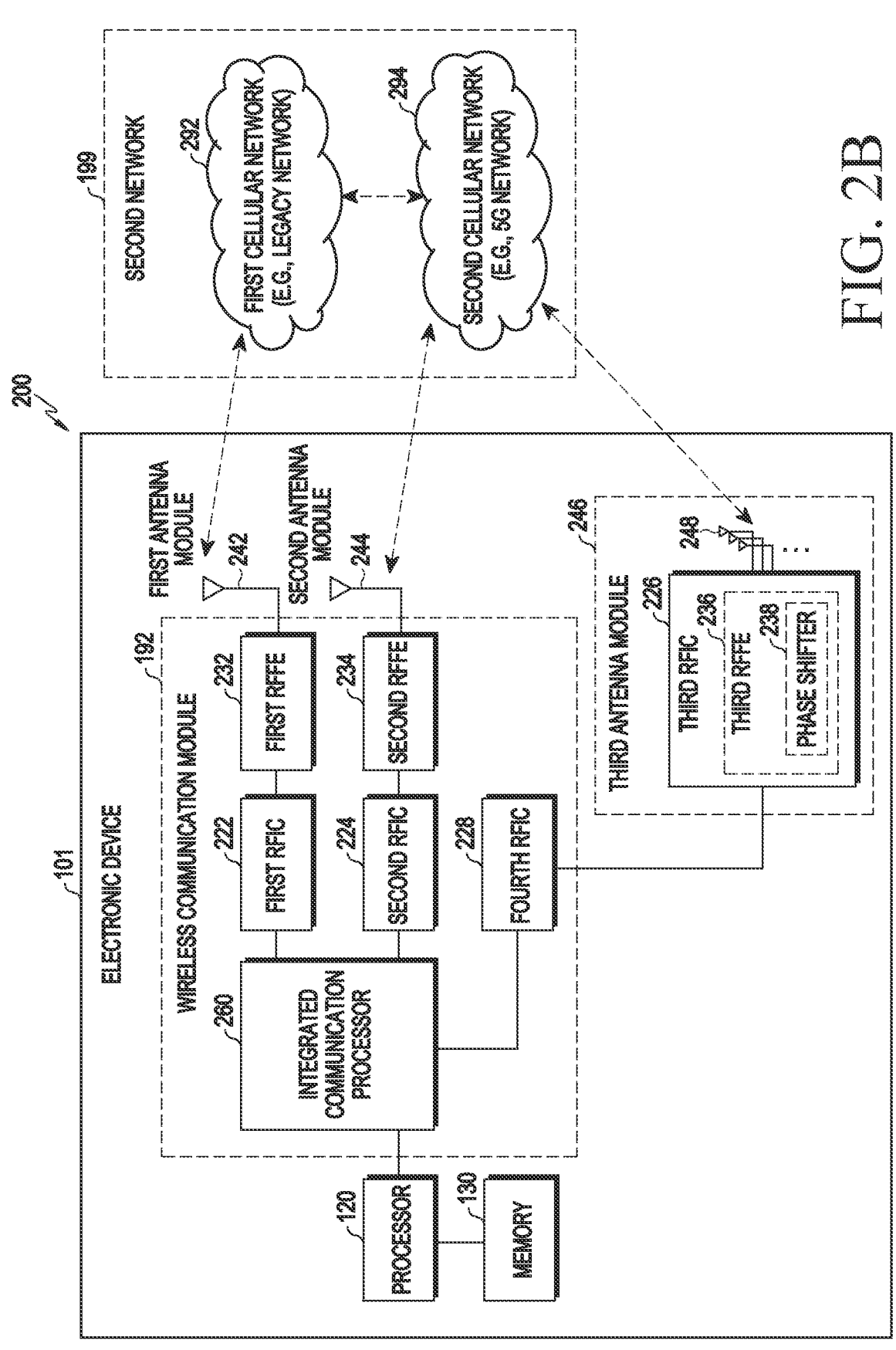
FIG. 2B is a block diagram of an electronic device for supporting legacy network communication and 5G network communication according to an embodiment of the disclosure.

FIG. 2B is a block diagram of an electronic device for supporting legacy network communication and 5G network communication according to an embodiment of the disclosure.

Referring to FIG. 2A, the electronic device 101 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, a third antenna module 246, and antennas 248. The electronic device 101 may further include a processor 120 and a memory 130. The second network 199 may include a first cellular network 292 and a second cellular network 294. In an embodiment, the electronic device 101 may further include at least one component among the components illustrated in FIG. 1, and the second network 199 may further include at least one other network. According to an embodiment, the first communication processor 212, the second communication processor 214, the first RFIC 222, the second RFIC 224, the fourth RFIC 228, the first RFFE 232, and the second RFFE 234 may form at least a part of a wireless communication module 192. According to an embodiment, the fourth RFIC 228 may be omitted, or may be included as a part of the third RFIC 226.

The first communication processor 212 may establish a communication channel in a band to be used for wireless communication with the first cellular network 292, and may support legacy network communication through the established communication channel According to an embodiment the first cellular network may be a legacy network including a second generation (2G), 3G, 4G, or long term evolution (LTE) network. The second communication processor 214 may establish a communication channel corresponding to a designated band (for example, about 6 GHz-60 GHz) among bands to be used for wireless communication with the second cellular network 294, and may support 5G network communication through the established communication channel According to an embodiment, the second cellular network 294 may be a 5G network defined by 3GPP. Additionally, according to an embodiment, the first communication processor 212 or the second communication processor 214 may establish a communication channel corresponding to another designated band (for example, about 6 GHz or less) among bands to be used for wireless communication with the second cellular network 294, and may support 5G network communication through the established communication channel.

The first communication processor 212 may transmit/receive data with the second communication processor 214. For example, data that has been classified to be transmitted through the second cellular network 294 may be changed to be transmitted through the first cellular network 292. In this case, the first communication processor 212 may receive transmission data from the second communication processor 214. For example, the first communication processor 212 may transmit/receive data with the second communication processor 214 through an inter-processor interface 213. The inter-processor interface 213 may be, for example, implemented as a universal asynchronous receiver/transmitter (UART) (for example, high speed-UART (HS-UART) or peripheral component interconnect bus express (PCIe)) interface, but the type thereof is not limited. Alternatively, the first communication processor 212 and the second communication processor 214 may exchange control information and packet data information by using a shared memory, for example. The first communication processor 212 may transmit/receive various pieces of information such as sensing information, information regarding output intensity, and resource block (RB) allocation information with the second communication processor 214.

Depending on implementation, the first communication processor 212 may not be directly connected to the second communication processor 214. In this case, the first communication processor 212 may transmit/receive data with the second communication processor 214 through the processor 120 (for example, application processor). For example, the first communication processor 212 and the second communication processor 214 may transmit/receive data with the processor 120 (for example, application processor) through an HS-UART interface or a PCIe interface, but the type of the interface is not limited. Alternatively, the first communication processor 212 and the second communication processor 214 may exchange control information and packet data information with the processor 120 (for example, application processor) by using a shared memory.

According to an embodiment, the first communication processor 212 and the second communication processor 214 may be implemented inside a single chip or a single package. According to an embodiment, the first communication processor 212 or the second communication processor 214 may be formed inside a single chip or a single package with a processor 120, an auxiliary processor 123, or a communication module 190. Referring to FIG. 2B, an integrated communication processor 260 may support all functions for communication with the first cellular network 292 and the second cellular network 294. For example, at least one of the processor 120, the first communication processor 212, the second communication processor 214, or the integrated communication processor 260 may be implemented as a single chip (or chipset), and those skilled in the art will understand that, in this case, the same may include a memory configured to store at least one instruction performed according to an embodiment of the disclosure and at least one processing means (or processing circuit) for executing the at least one instruction.

The first RFIC 222 may, during transmission, convert a baseband signal generated by the first communication processor 212 to an RF signal of about 700 megahertz (MHz) to about 3 GHz used by the first cellular network 292 (for example, legacy network). During reception, an RF signal may be acquired from the first cellular network 292 (for example, legacy network) through an antenna (for example, first antenna module 242), and may be preprocessed through an RFFE (for example, first RFFE 232). The first RFIC 222 may convert the preprocessed RF signal to a baseband signal such that the same can be processed by the first communication processor 212.

The second RFIC 224 may, during transmission, convert a baseband signal generated by the first communication processor 212 or the second communication processor 214 to an RF signal (hereinafter, referred to as 5G Sub6 RF signal) in a Sub6 band (for example, about 6 GHz or less) used by the second cellular network 294 (for example, 5G network). During reception, a 5G Sub6 RF signal may be acquired from the second cellular network 294 (for example, 5G network) through an antenna (for example, second antenna module 244), and may be preprocessed through an RFFE (for example, second RFFE 234). The second RFIC 224 may convert the preprocessed 5G Sub6 RF signal to a baseband signal such that the same can be processed by a corresponding communication processor among the first communication processor 212 or the second communication processor 214.

The third RFIC 226 may convert a baseband signal generated by the second communication processor 214 to an RF signal (hereinafter, referred to as 5G Above6 RF signal) in a 5G Above6 band (for example, about 6 GHz-about 60 GHz) to be used by the second cellular network 294 (for example, 5G network). During reception, a 5G Above6 RF signal may be acquired from the second cellular network 294 (for example, 5G network) through an antenna (for example, antenna 248) and may be preprocessed through the third RFFE 236. The third RFIC 226 may convert the preprocessed 5G Above6 RF signal to a baseband signal such that the same can be processed by the second communication processor 214. According to an embodiment, the third RFFE 236 may be formed as a part of the third RFIC 226.

According to an embodiment, the electronic device 101 may include a fourth RFIC 228 separately from the third RFIC 226 or as at least a part thereof. In such a case, the fourth RFIC 228 may convert a baseband signal generated by the second communication processor 214 to an RF signal (hereinafter, referred to as IF signal) in an intermediate frequency band (for example, about 9 GHz-about 11 GHz), and may then transfer the IF signal to the third RFIC 226. The third RFIC 226 may convert the IF signal to a 5G Above6 RF signal. During reception, a 5G Above6 RF signal may be received from the second cellular network 294 (for example, 5G network) through an antenna (for example, antenna 248) and may be converted to an IF signal by the third RFIC 226. The fourth RFIC 228 may convert the IF signal to a baseband signal such that the second communication processor 214 can process the same.

According to an embodiment, the first RFIC 222 and the second RFIC 224 may be implemented as at least a part of a single chip or a single package. According to an embodiment, when the first RFIC 222 and the second RFIC 224 are implemented as a single chip or a single package in FIG. 2A or 2B, the same may be implemented as an integrated RFIC. In this case, the integrated RFIC may be connected to the first RFFE 232 and the second RFFE 234, may convert a base band signal to a signal in a band supported by the first RFFE 232 and/or the second RFFE 234, and may transmit the converted signal to one of the first RFFE 232 and the second RFFE 234. According to an embodiment, the first RFFE 232 and the second RFFE 234 may be implemented as at least a part of a single chip or a single package. According to an embodiment, at least one antenna module among the first antenna module 242 or the second antenna module 244 may be omitted or combined with the other antenna module so as to process RF signals in corresponding multiple bands.

According to an embodiment, the third RFIC 226 and the antenna 248 may be disposed on an identical substrate so as to form a third antenna module 246. For example, the wireless communication module 192 or the processor 120 may be disposed on a first substrate (for example, main PCB). In such a case, the third RFIC 226 may be disposed in a partial area (for example, lower surface) of a second substrate (for example, sub PCB) separate from the first substrate, and the antenna 248 may be disposed in another partial area (for example, upper surface) thereof, thereby forming the third antenna module 246. It is possible to dispose the third RFIC 226 and the antenna 248 on an identical substrate such that the length of a transmission line therebetween is reduced. This may reduce loss (for example, attenuation) of a signal in a high-frequency band (for example, about 6 GHz-about 60 GHz) used for 5G network communication, for example, by the transmission line. As a result, the electronic device 101 may improve the quality or speed of communication with the second cellular network 294 (for example, 5G network).

According to an embodiment, the antenna 248 may be formed as an antenna array including multiple antenna elements that can be used for beamforming. In such a case, the third RFIC 226 may include multiple phase shifters 238 corresponding to the multiple antenna elements as a part of the third RFFE 236, for example. During transmission, each of the multiple phase shifters 238 may convert the phase of a 5G Above6 RF signal to be transmitted to the outside (for example, base station of 5G network) of the electronic device 101 through a corresponding antenna element. During reception, each of the multiple phase shifters 238 may convert the phase of a 5G Above6 RF signal received from the outside through a corresponding antenna element to an identical or substantially identical phase. This enables transmission or reception through beamforming between the electronic device 101 and the outside.

The second cellular network 294 (for example, 5G network) may be operated independently (for example, standalone (SA)) of the first cellular network 292 (for example, legacy network) or may be operated while being connected thereto (for example, non-standalone (NSA)). For example, the 5G network may have an access network (for example, 5G radio access network (RAN) or next generation RAN (NG RAN)) only, and may have no core network (for example, next generation core (NGC)). In such a case, the electronic device 101 may access the access network of the 5G network and may then access an external network (for example, Internet) under the control of the core network (for example, evolved packed core (EPC)) of the legacy network. Protocol information (for example, LTE protocol information) for communication with the legacy network or protocol information (for example, new radio (NR)) protocol information) for communication with the 5G network may be stored in the memory 130 and may be accessed by another component (for example, processor 120, first communication processor 212, or second communication processor 214).

Figure 3:
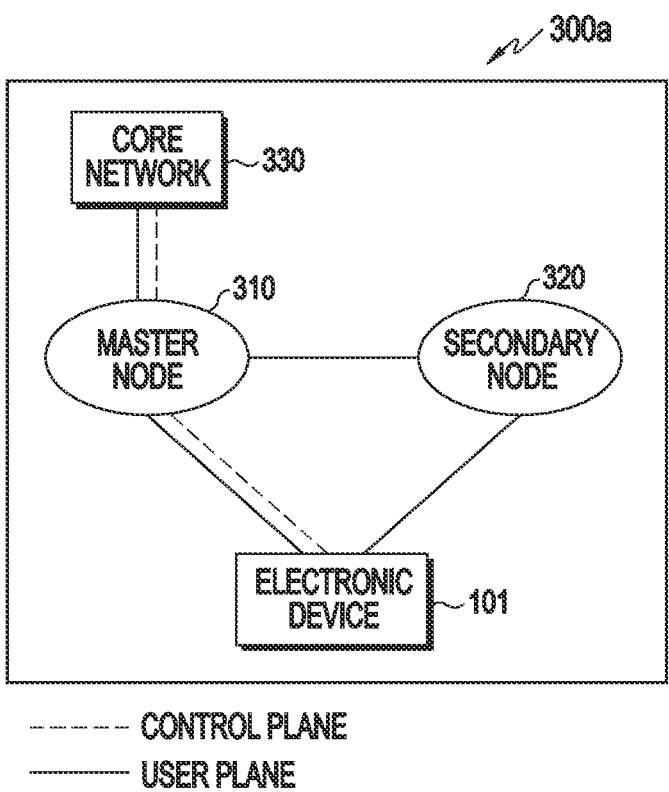
FIG. 3 illustrates wireless communication systems configured to provide a network of legacy communication and/or 5G communication according to an embodiment of the disclosure.

FIG. 3 illustrates wireless communication systems providing a network of legacy communication and/or 5G communication according to an embodiment of the disclosure.

Referring to FIG. 3, the network environment 300a may include at least one of a legacy network and a 5G network. The legacy network may include, for example, a 4G or LTE base station (for example, eNodeB (eNB)), based the 3GPP standards, configured to support wireless connection with the electronic device 101, and an evolved packet core (EPC) for managing 4G communication. The 5G network may include, for example, a new radio (NR) base station (for example, gNodeB (gNB)) configured to support wireless connection with the electronic device 101 and a 5th generation core (5GC) configured to manage 5G communication of the electronic device 101.

According to an embodiment, the electronic device 101 may transmit/receive a control message and user data for legacy communication and/or 5G communication. The control message may include, for example, a message related to at least one of security control of the electronic device 101, bearer setup, authentication, registration, or mobility management. The user data may refer to user data, for example, other than control messages transmitted/received between the electronic device 101 and a core network 330 (for example, EPC).

Referring to FIG. 3, the electronic device 101 according to an embodiment may transmit/receive at least one of a control message or user data with at least a part (for example, NR base station, 5GC) of a 5G network by using at least a part (for example, LTE base station, EPC) of a legacy network.

According to an embodiment, the network environment 300a may provide a network environment which provides wireless communication dual connectivity to the LTE base station and the NR base station, and which transmits/receives a control message with the electronic device 101 through a core network 330 of at least one of EPC or 5GC.

According to an embodiment, in a DC environment, a base station among the LTE base station or the NR base station may operate as a master node (MN) 310, and the other may operate as a secondary node (SN) 320. The MN 310 may be connected to the core network 330 so as to transmit/receive a control message. The MN 310 and the SN 320 may be connected through a network interface so as to transmit/receive a message related to radio resource (for example, communication channel) management with each other.

According to an embodiment, the MN 310 may be configured as an LTE base station, the SN 320 may be configured as an NR base station, and the core network 330 may be configured as an EPC. For example, a control message may be transmitted/received through the LTE base station and the EPC, and user data may be transmitted/received through at least one of the LTE base station or the NR base station.

According to an embodiment, the MN 310 may be configured as an NR station, the SN 320 may be configured as an LTE station, and the core network 330 may be configured as a 5GC. For example, a control message may be transmitted/received through the NR base station and the 5GC, and user data may be transmitted/received through at least one of the LTE base station or the NR base station.

According to an embodiment, the electronic device 101 may be registered in at least one of the EPC or the 5GC so as to transmit/receive a control message.

According to an embodiment, the EPC or the 5GC may interwork so as to manage communication of the electronic device 101. For example, mobility information of the electronic device 101 may be transmitted/received through an interface between the EPC and the 5GC.

As described above, dual connectivity through the LTE base station and the NR base station may be referred to as EN-DC. Meanwhile, multi RAT dual connectivity (MR DC) may be variously applied in addition to EN-DC. For example, a first network and a second network according to MR DC may all relate to LTE communication, and the second network may be a network corresponding to a small cell of a specific frequency. For example, a first network and a second network according to MR DC may all relate to 5G, the first network may correspond to a frequency band below 6 GHz (for example, below 6), and the second network may correspond to a frequency band equal to or above 6 GHz (for example, over 6). Those skilled in the art will easily understand that, in addition to the above-mentioned examples, any network structure to which dual connectivity is applicable can be applied to an embodiment of the disclosure.

Figure 4:
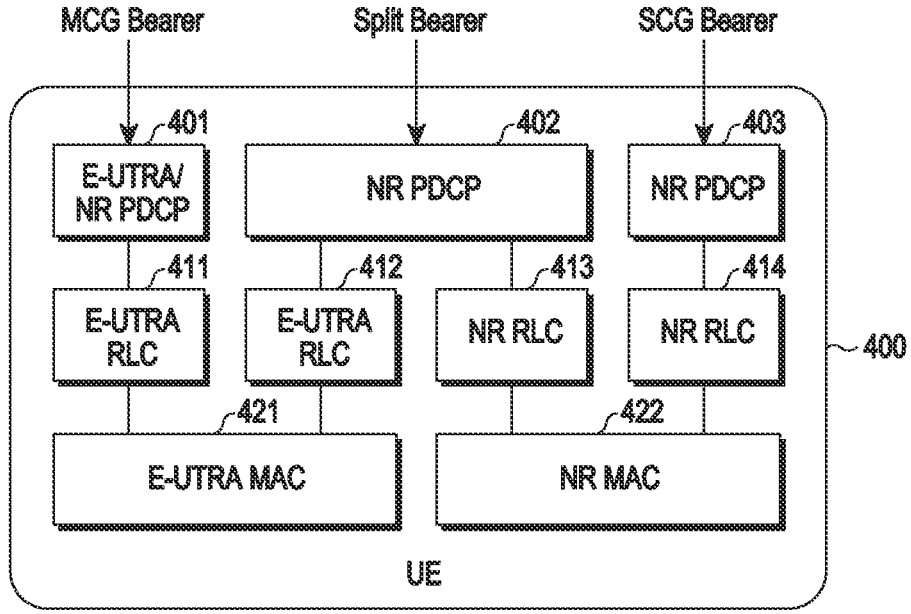
FIG. 4 illustrates bearers in UE according to an embodiment of the disclosure.

FIG. 4 illustrates bearers in user equipment according to an embodiment of the disclosure.

Bearers that are possible in a 5G non-standalone network environment (for example, network environment 300a in FIG. 3) may include a master cell group (MCG) bearer, a secondary cell group (SCG) bearer, and a split bearer. In user equipment (UE) 400, an E-UTRA/NR packet data convergence protocol (PDCP) entity 401 and NR PDCP entities 402 and 403 may be configured. In the UE 400, E-UTRA radio link control (RLC) entities 411 and 412 and NR RLC entities 413 and 414 may be configured. In the UE 400, an e-UTRA MAC entity 421 and an NR MAC entity 422 may be configured. The UE may refer to user device capable of communicating with a base station, and may be used interchangeably with the electronic device 101 in FIG. 1. For example, the description that the UE performs a specific operation in an embodiment may mean that at least one element included in the electronic device 101 performs the specific operation.

The MCG may correspond to the master node (MN) 310 in FIG. 3, for example, and the SCG may correspond to the secondary node (SN) 320 in FIG. 3, for example. If a node to perform communication is determined, the UE 400 may configure various entities illustrated in FIG. 4 in order to communication with the determined node (for example, base station). The PDCP-layer entities 401, 402, and 403 may receive data (for example, PDCP SDU corresponding to internet protocol (IP) packet) and may output converted data (for example, PDCP protocol data unit (PDU)) that reflects additional information (for example, header information). The RLC-layer entities 411, 412, 413, and 414 may receive converted data (for example, PDCP PDU) output from the PDCP-layer entities 401, 402, and 403 and may output converted data (for example, RLC PDU) that reflects additional information (for example, header information). The MAC-layer entities 421 and 422 may receive converted data (for example, RLC PDU) output from the RLC-layer entities 411, 412, 413, and 414, may output converted data (for example, MAC PDU) that reflects additional information (for example, header information), and may transfer the same to a physical layer (not illustrated).

The MCG bearer may be associated with a path (or data) capable of transmitting/receiving data by using only a resource or an entity corresponding to the MN, in connection with dual connectivity. The SCG bearer may be associated with a path (or data) capable of transmitting/receiving data by using only a resource or an entity corresponding to the SN, in connection with dual connectivity. The split bearer may be associated with a path (or data) capable of transmitting/receiving data by using a resource or an entity corresponding to the MN and a resource or an entity corresponding to the SN, in connection with dual connectivity. Accordingly, as in FIG. 4, the split bearer may be all associated with the E-UTRA RLC entity 412, the NR RLC entity 413, the E-UTRA MAC entity 421, and the NR MAC entity 422 through the NR PDCP entity 402.

Figure 5:
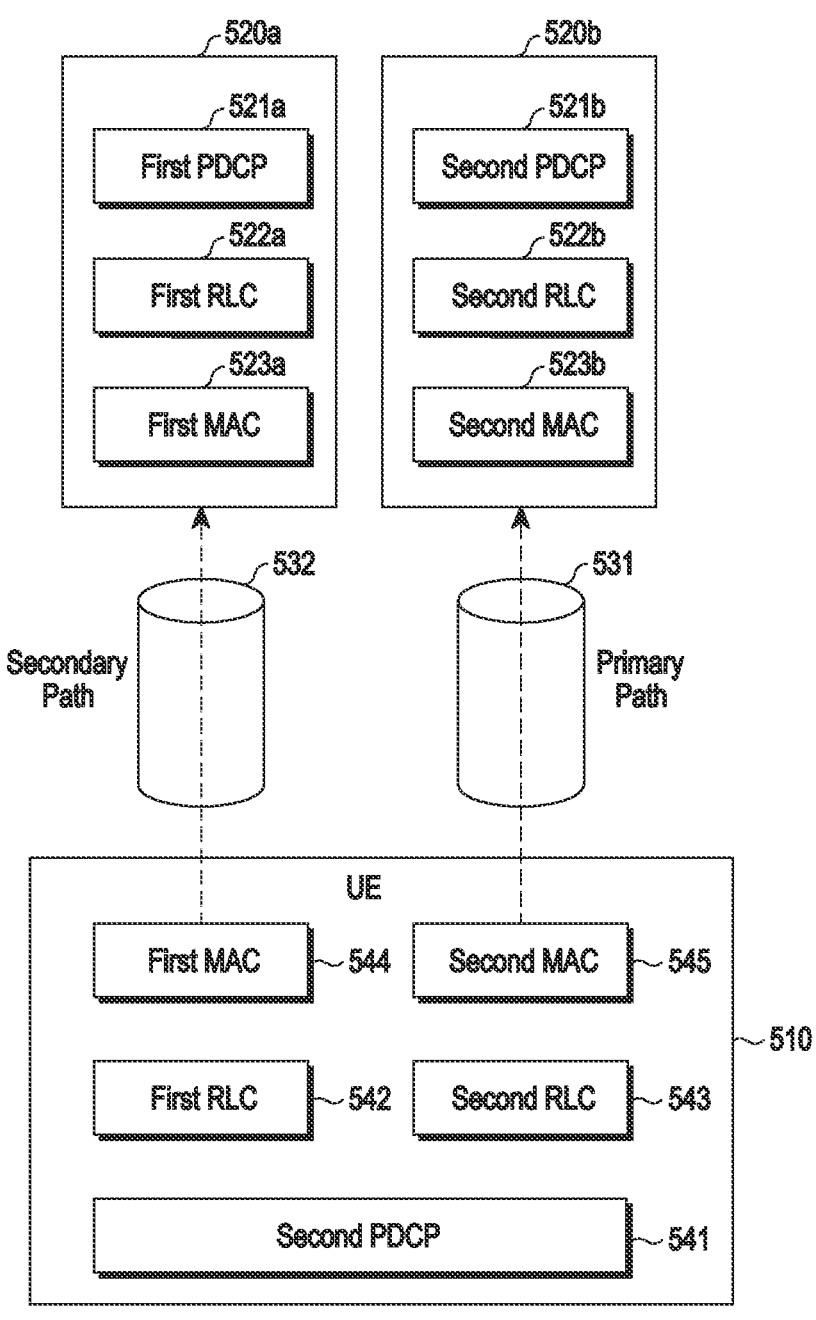
FIG. 5 illustrates an uplink path between UE and base stations according to an embodiment of the disclosure.

FIG. 5 illustrates an uplink path between user equipment and base stations according to an embodiment of the disclosure.

User equipment 510 according to an embodiment (for example, electronic device 101) may communicate with base stations 520a and 520b, based on a split bearer, in FIG. 5. Accordingly, transmission data (for example, IP packets) to be transmitted from the user equipment 510 to the base stations 520a and 520b may be transferred to a second RLC entity 543 and a second MAC entity 545 or to a first RLC entity 542 and a first MAC entity 544 through a second PDCP entity 541. For example, the first RLC entity 542 and the first MAC entity 544 may be associated with a first network, and the second RLC entity 543 and the second MAC entity 545 may be associated with a second network. The first base station (BS) 520a may configure a first PDCP entity 521a, a first RLC entity 522a, and a first MAC entity 523a. The second base station (BS) 520b may configure a second PDCP entity 521b, a second RLC entity 522b, and a second MAC entity 523b. The path of association with the second RLC entity 543 and the second MAC entity 545 of the user equipment 510 may be a primary path 531, and the path of association with the first RLC entity 542 and the first MAC entity 544 may be a secondary path 532. In this regard, the first PDCP entity 521a may be implemented identically to the second PDCP entity 521b. For example, in order to implement EN-DC, when the BS 520a is an LTE BS, the first PDCP entity 521a may be configured as an NR PDCP entity. In an embodiment, a specific PDCP entity (for example, NR PDCP entity) may exist in the BS 520a or may exist in the BS 520b. When a split bearer has been configured, at least one of the first PDCP entity 521a or the second PDCP entity 521b may transmit data to the core network. In an embodiment, one of the first PDCP entity 521a or the second PDCP entity 521b may not exist. The BS 520a and the BS 520b may also directly communicate with each other.

The first and second networks are not limited as long as they are capable of dual connectivity. For example, the first and second networks may correspond to LTE communication and NR communication, respectively. For example, the first and second networks may both relate to LTE communication, and the second network may correspond to a small cell of a specific frequency. For example, the first and second networks may both relate to 5G, the first network may correspond to a frequency band below 6 GHz (for example, below 6), and the second network may correspond to a frequency band equal to or above 6 GHz (for example, over 6).

The user equipment 510 according to an embodiment may transmit transmission data by using at least one of the BSs 520a and 520b, the first network, and the second network, based on a split bearer. The user equipment 510 according to an embodiment may configure the second network associated with the second BS 520b corresponding to the SCG as a primary path 531, and may configure the first network associated with the first BS 520a corresponding to the MCG as a secondary path 532. For example, the user equipment 510 may configure the second network associated with the SCG as a primary path 531, based on information indicating a primary path received from the MN. The information indicating a primary path received from the MN may be included in an RRC message (for example, RRCReconfiguration message) and received. In an embodiment, the scheme in which the user equipment 510 configured the primary path is not limited. The primary path may be determined based on each communication operator's policy, for example, and the user equipment 510 may receive information indicating the primary path, and may then identify the primary path. The primary path may indicate the cell group identification (ID) and logical channel identifier (LCID) of a primary RLC entity related to uplink data transmission when a PDCP entity is associated with more than one RLC entities. The second PDCP entity 521b may be included in a base station 520a having the primary path. According to an embodiment, the first PDCP entity 521a may be included in a base station 520b having a secondary path.

In an embodiment, the user equipment 510 may identify information regarding an uplink split threshold. The user equipment 510 may receive information regarding the uplink split threshold from the MN and may identify the same. The information regarding the uplink split threshold may be included in a UE-specific or UE-dedicated RRC message (for example, RRCReconfiguration message). According to an embodiment, the scheme in which the user equipment 510 identifies the information regarding the uplink split threshold is not limited.

Table 1 below illustrates a format of the RRCReconfiguration message according to an embodiment.

TABLE 1

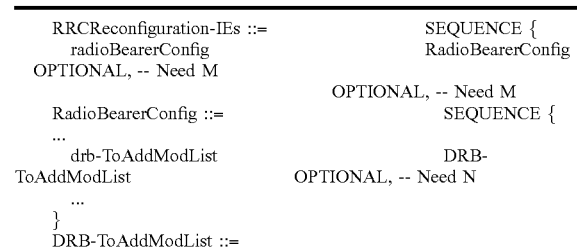

TABLE 1-continued

```
SEQUENCE (SIZE (1..maxDRB)) OF DRB-ToAddMod
   DRB-ToAddMod ::=
SEQUENCE {
   ...
      pdcp-Config                            PDCP-
Config                     OPTIONAL,  -- Cond PDCP
   ...
   }
      PDCP-Config ::=          SEQUENCE {
      drb                         SEQUENCE {
   ...
         moreThanOneRLC        SEQUENCE {
         primaryPath              SEQUENCE {
         cellGroup                CellGroupId
         OPTIONAL,             -- Need R
         logicalChannel
LogicalChannelIdentity       OPTIONAL -- Need R
         },
         ul-DataSplitThreshold      UL-DataSplitThreshold
         OPTIONAL, -- Cond SplitBearer
         pdcp-Duplication            ENUMERATED
                                       { true }

OPTIONAL -- Need R
      }
```

As underlined above, ul-datasplitthreshold may be defined as the uplink split threshold inside the RRCRecon-figuration message.

The information regarding the uplink split threshold may also be determined based on each communication operator's policy, for example. The user equipment 510 may identify that a transmitting PDCP entity (for example, second PDCP entity 541) is associated with two or more RLC entities (for example, first RLC entity 542 and second RLC entity 543), and the two or more associated RLC entities (for example, first RLC entity 542 and second RLC entity 543) belong to different cell groups. In this case, the user equipment 510 may identify whether the total amount of the PDCP data volume and the RLC data volume is larger than or equal to the uplink split threshold. When the total amount of the PDCP data volume and the RLC data volume is larger than or equal to the uplink split threshold, the transmitting PDCP entity (for example, second PDCP entity 541) of the user equipment 510 may submit a PDCP PDU to a primary RLC entity or secondary RLC entity. When the total amount of the PDCP data volume and the RLC data volume is smaller than the uplink split threshold, the transmitting PDCP entity (for example, second PDCP entity 541) of the user equipment 510 may submit the PDCP PDU only to the primary RLC entity. According to the above description, the user equipment 510 may transmit data through the primary path 531 and the secondary path 532 when the size of data to be transmitted is larger than or equal to a threshold. The user equipment 510 may transmit data only through the primary path 531 when the size of data to be transmitted is less than the threshold.

Figure 6:
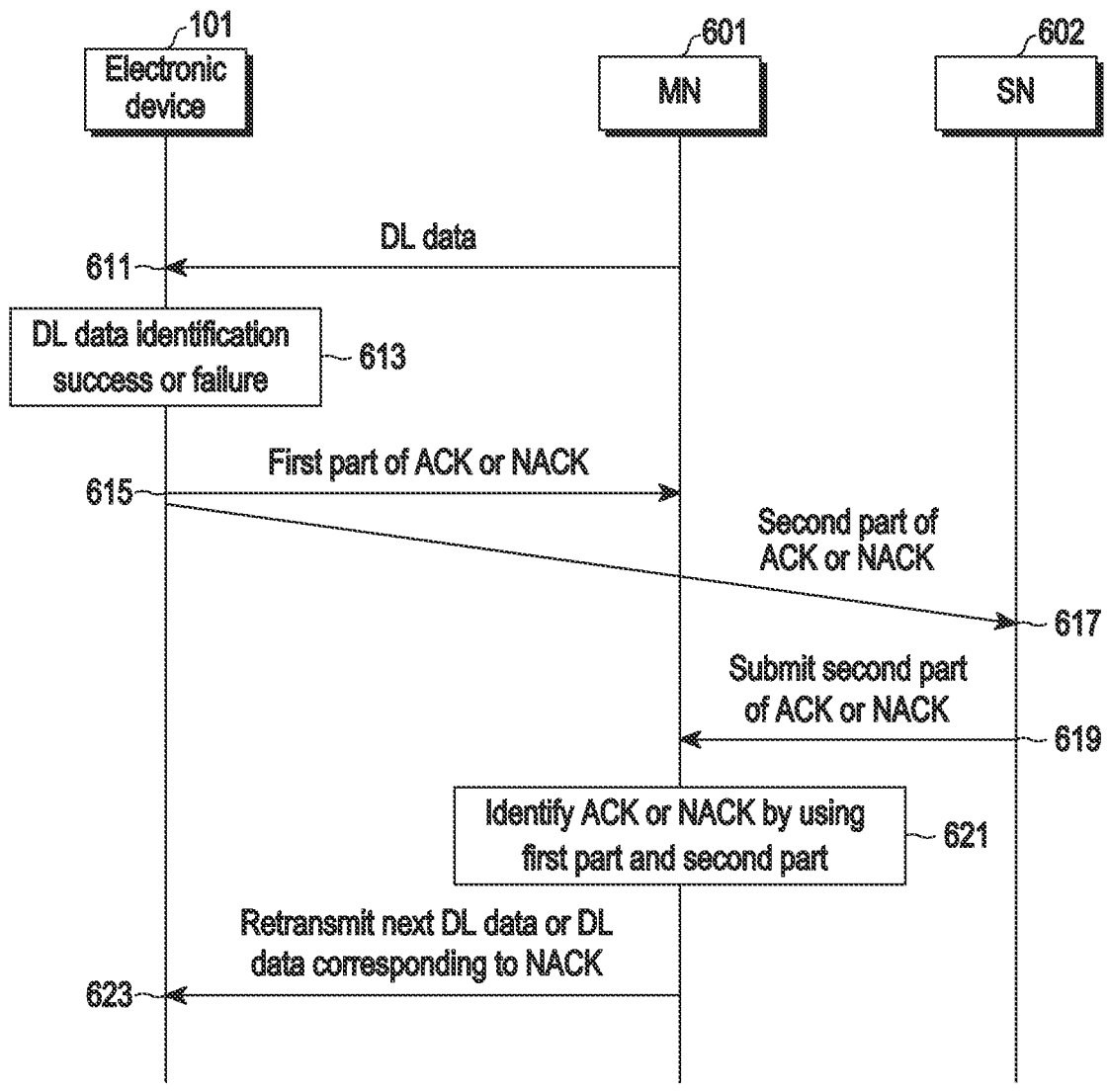
FIG. 6 is a flowchart illustrating operations of an electronic device and nodes a comparative example given for comparison with according to an embodiment of the disclosure.

FIG. 6 is a flowchart illustrating operations of an electronic device and nodes a comparative example given for comparison according to an embodiment of the disclosure.

At least some of the operations of the electronic device and/or nodes according to the comparative example may also be performed by an electronic device and/or nodes according to an embodiment.

The electronic device 101 may receive downlink data from an MN 601 in operation 611. For example, the electronic device 101 may receive downlink data, based on a physical downlink sharing channel (PDSCH), from the MN 601, but is not limited thereto. Meanwhile, although the electronic device 101 is illustrated as receiving downlink data from the MN 601 in operation 611, the electronic device 101 may receive downlink data from an SN 602, or may at least simultaneously receive downlink data from the MN 601 and the SN 602. It is assumed in the example of FIG. 6 that the electronic device 101 has connection based on dual connectivity established with each of the MN 601 and the SN 602.

The electronic device 101 may succeed in identifying downlink data or may fail to identify downlink data, in operation 613. The electronic device 101 may transmit a first part of an ACK to the MN 601, if the same has succeeded in identifying downlink data, based on a first RAT, in operation 615, or may transmit a first part of a NACK to the MN 601 if the same has failed to identify downlink data. The electronic device 101 may transmit a second part of the ACK to the SN 602, if the same has succeeded in identifying downlink data, based on a second RAT, in operation 617, or may transmit a first part of the NACK to the SN 602 if the same has failed to identify downlink data. For example, when the size of the ACK or NACK is larger than or equal to a threshold (for example, ul-datasplitthreshold), the electronic device 101 may transmit the ACK or NACK to the MN 601 and the SN 602, based on the first RAT and the second RAT. The ACK or NACK may be transmitted based on a physical uplink sharing channel (PUSCH) or physical uplink control channel (PUCCH), but is not limited thereto.

The SN 602 may submit a second part of the ACK or NACK to the MN 601 through an Xn interface, for example, in operation 619. The MN 601 may identify the ACK or NACK, based on the first part of the ACK or NACK and the second part of the ACK or NACK, in operation 621. In the MN 601, reordering and/or reassemble of data from the SN 602 may be performed. The MN 601 may transmit next DL data if the ACK has been identified, or may retransmit DL data corresponding to the NACK if the NACK has been identified, in operation 623. When the ACK or NACK is transmitted through a split bearer based on multiple RATs described above, there is a possibility that the time to identify the ACK or NACK in the network (for example, MN 601) will be delayed.

Figure 7:
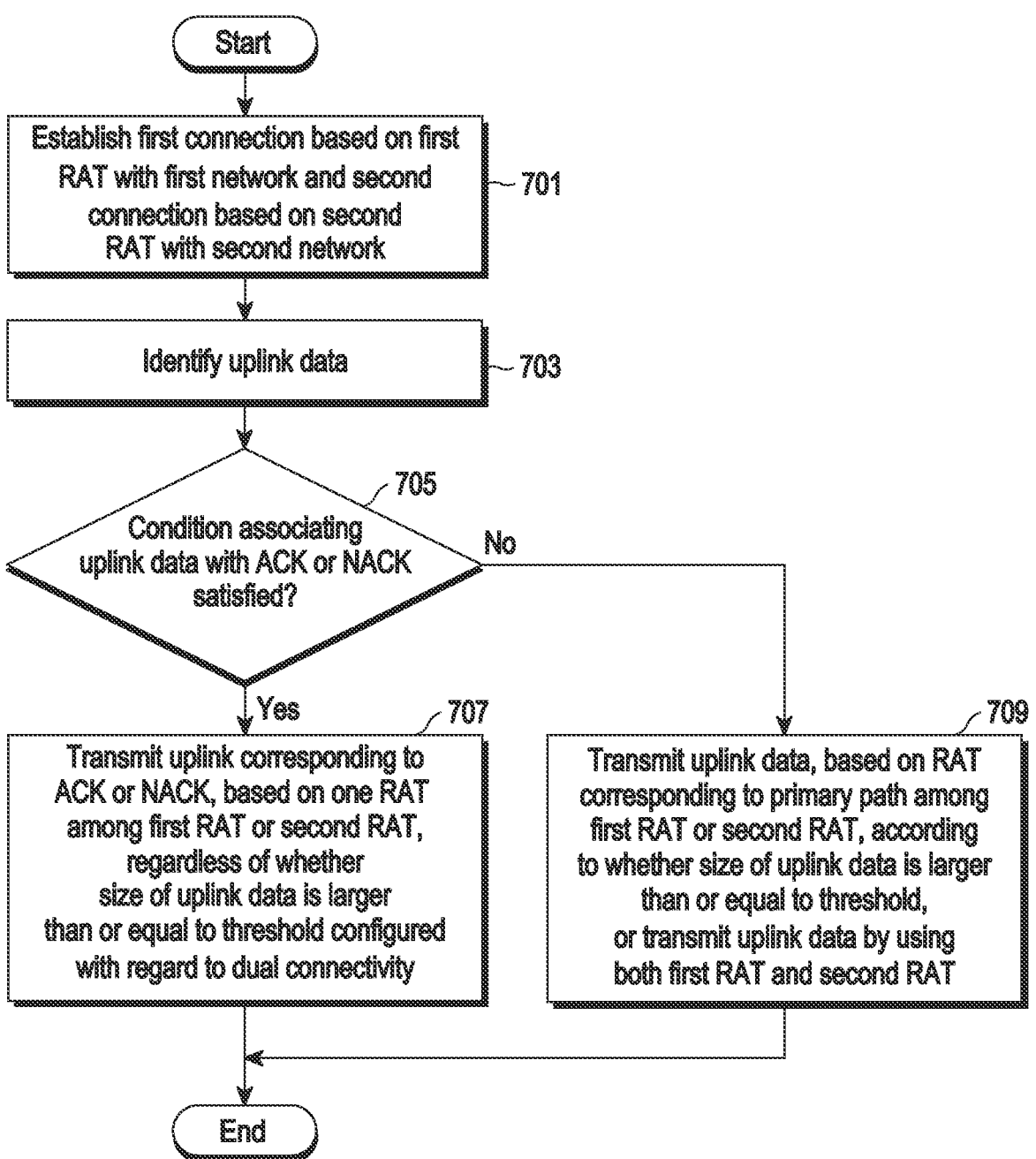
FIG. 7 is a flowchart illustrating a method for operating an electronic device according to an embodiment of the disclosure.

FIG. 7 is a flowchart illustrating a method for operating an electronic device according to an embodiment of the disclosure.

According to an embodiment, an electronic device 101 (for example, at least one of a processor 120, a first communication processor 212, a second communication processor 214, or an integrated communication processor 260) may establish first connection based on a first RAT with a first network and second connection based on a second RAT with a second network in operation 701. For example, when the first network corresponds to am MN, and when the second network corresponds to an SN, the electronic device 101 may first establish first connection (for example, RRC connection) with the first network. The electronic device 101 may receive an RRC reconfiguration message including a measconfig related to an intra-RAT from the first network. The electronic device 101 may perform measurement regarding a measurement object associated with the second network, for example, identified based on the measconfig. Based on the measurement result satisfying a reportconfig corresponding to the measurement object, the electronic device 101 may transmit a measurement report (MR) message to the first network. The first network may identify whether there is an SCG addition related to the second network, based on the measurement result identified based on the received MR message. If the SCG addition related to the second network is determined, the first network may notify the second network thereof and may receive an ack corresponding to the notification from the second network. The first network may transmit a message (for example, RRC reconfiguration message) including information of the SCG addition related to the second network to the electronic device 101. The electronic device 101 may perform a random access (RA) procedure with regard to the second network identified based on the RRC reconfiguration message. Accordingly, the electronic device 101 may establish second connection (for example, RRC connection) with the second network. Meanwhile, the above-mentioned establishment of connections based on multiple RATs, respectively, based on dual connectivity is only an example, and the method for performing the same is not limited.

According to an embodiment, the electronic device 101 may identify uplink data in operation 703. The electronic device 101 may identify whether a condition that associates the uplink data with an ACK or NACK is satisfied in operation 705. For example, identifiable conditions may be preconfigured in a communication processor of the electronic device 101 (for example, at least one of a first communication processor 212, a second communication processor 214, or an integrated communication processor 260), the corresponding conditions may be satisfied when the uplink data is an ACK or NACK, and various conditions will be described later. The description that a condition that associates the uplink data with an ACK or NACK is satisfied may mean that the uplink data has been generated based on a single ACK or NACK or a group of ACKs or NACKs, but is not limited thereto.

According to an embodiment, when the condition that associates with an ACK or NACK is satisfied (Yes in operation 705), the electronic device 101 may transmit uplink data corresponding to the ACK or NACK, based on one of a first RAT or a second RAT, regardless of whether the size of the uplink data is larger than or equal to a threshold (for example, ul-DataSplitThreshold) set with regard to dual connectivity in operation 707. In this connection, the RAT selected from the first RAT or the second RAT is not limited. For example, a RAT corresponding to a primary path may be selected from the two RATs, a RAT corresponding to a secondary path may be selected from the two RATs, or a RAT may be selected based on a result of comparing parameters related to the two RATs, and an embodiment regarding RAT selection will be described later. In this case, even when the size of uplink data corresponding to the ACK or NACK is larger than or equal to the threshold, the uplink data corresponding to the ACK or NACK may be transmitted solely based on a single RAT. Accordingly, it may be possible to identify an ACK or NACK by a network within a shorter period of time than the period of time necessary to identify an ACK or NACK based on two RATs described with reference to FIG. 6, and delay may be prevented (or reduced).

According to an embodiment, when the condition that associates with an ACK or NACK is not satisfied (No in operation 705), the electronic device 101 may transmit uplink data based on a RAT corresponding to a primary path among the first RAT or the second RAT, according to whether the size of the uplink data is larger than or equal to the threshold, or may transmit uplink data by using both the first and second RATs, in operation 709. The fact that the condition that associates with an ACK or NACK is not satisfied may mean that the uplink data is not associated with the ACK or NACK. In this case, the electronic device 101 may transmit uplink data through two paths or one path (for example, primary path) according to whether the size of the uplink data is larger than or equal to the threshold. For example, when the size of the uplink data is larger than or equal to the threshold, the electronic device 101 may transmit uplink data by using both the primary path and the secondary path. For example, when the size of the uplink data is less than the threshold, the electronic device 101 may transmit uplink data by using the primary path. As described above, when the uplink data is associated with the ACK or NACK, uplink data is transmitted based on a single RAT such that the time necessary to identify the ACK or NACK in the network may be reduced compared with a case in which the same is transmitted based on both RATs.

Figure 8:
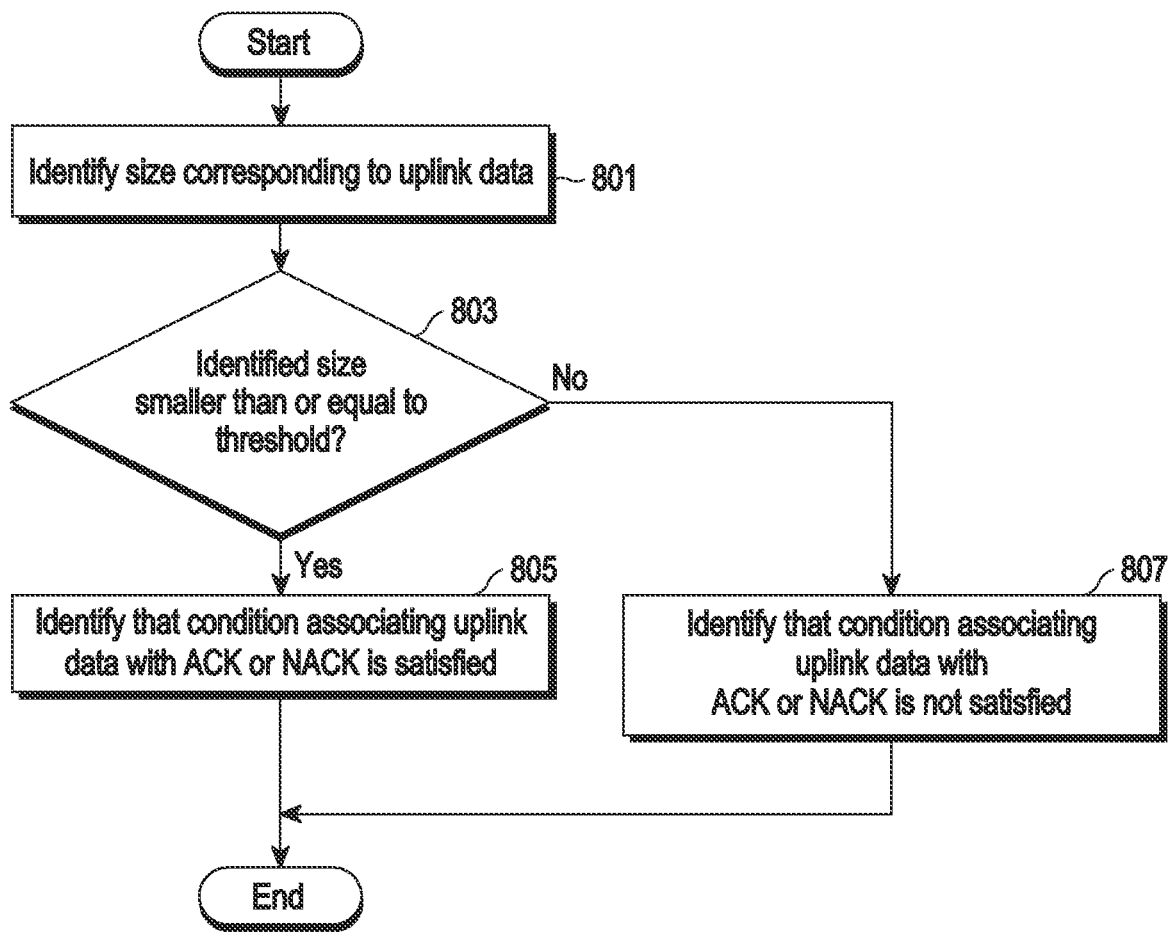
FIG. 8 is a flowchart illustrating a method for operating an electronic device according to an embodiment of the disclosure.

FIG. 8 is a flowchart illustrating a method for operating an electronic device according to an embodiment of the disclosure.

According to an embodiment, an electronic device 101 (for example, at least one of a processor 120, a first communication processor 212, a second communication processor 214, or an integrated communication processor 260) may identify a size corresponding to uplink data in operation 801. The electronic device 101 may identify whether the identified size is smaller than or equal to a threshold size in operation 803. A condition that makes the identified size smaller than or equal to the threshold size may be an example of the condition that associates the uplink data with an ACK or NACK in operation 705 in FIG. 7. The size of the ACK or NACK may be relatively smaller than the size of general uplink data (for example, transmission data generated by an application). The threshold size may be determined, for example, according to a statistical scheme, based on multiple various sizes of the ACK or NACK, but the scheme for determining the same is not limited. Meanwhile, the size of data may be expressed, for example, in terms of a size unit of at least one data unit (for example, SDU and/or PDU) or throughput unit, but those skilled in the art will understand that there is no limit as long as the same is a unit related to the size of data. In an example, the data size may be 100 Mbps, but the numerical value is not limited. When the identified size is smaller than or equal to the threshold size (Yes in operation 803), the electronic device 101 may identify that the condition that associates the uplink data with an ACK or NACK is satisfied in operation 805. In this case, the electronic device 101 may transmit uplink data corresponding to the ACK or NACK, based on one of the first RAT or the second RAT, regardless of whether a threshold (for example, ul-DataSplitThreshold) set with regard to dual connectivity is exceeded. When the identified size exceeds the threshold size (No in operation 803), the electronic device 101 may identify that the condition that associates the uplink data with an ACK or NACK is not satisfied in operation 807. In this case, the electronic device 101 may transmit uplink data based on a RAT corresponding to a primary path among the first or the second RAT, according to whether the size of the uplink data is larger than or equal to a threshold (for example, ul-DataSplitThreshold), or may transmit uplink data by using both the first RAT and the second RAT. For example, when the size of the uplink data is larger than or equal to the threshold, the electronic device 101 may transmit uplink data by using both the primary path and the secondary path. For example, when the size of the uplink data is less than the threshold, the electronic device 101 may transmit uplink data by using the primary path. As described above, an ACK or NACK having a size smaller than that of general uplink data (for example, uplink data generated by an application)

may be transmitted to a network based on a single RAT, instead of two RATs, thereby preventing (or reducing) ACK or NACK processing delay.

Figure 9:
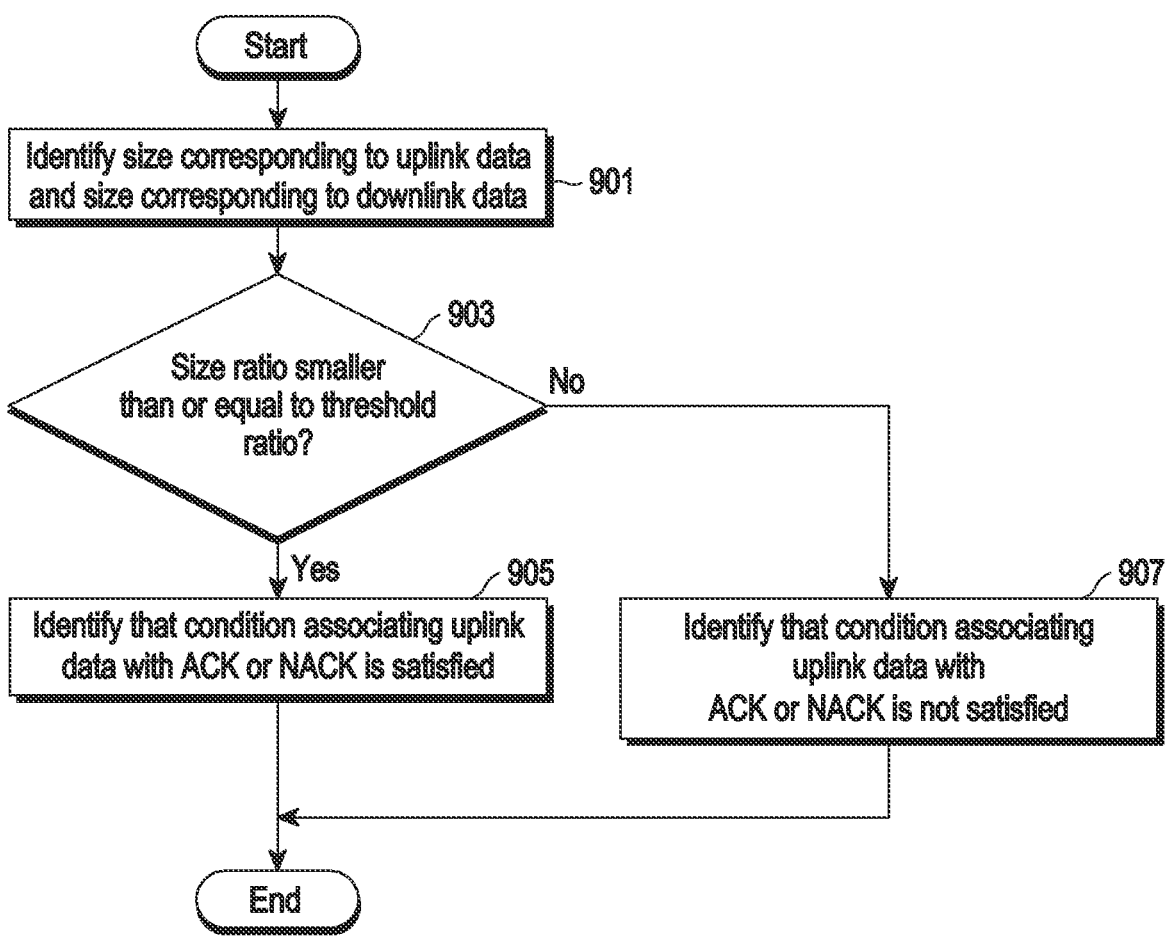
FIG. 9 is a flowchart illustrating a method for operating an electronic device according to an embodiment of the disclosure.

FIG. 9 is a flowchart illustrating a method for operating an electronic device according to an embodiment of the disclosure.

According to an embodiment, an electronic device 101 (for example, at least one of a processor 120, a first communication processor 212, a second communication processor 214, or an integrated communication processor 260) may identify a size corresponding to uplink data and a size corresponding to downlink data in operation 901. The electronic device 101 may identify whether the size ratio of the size corresponding to uplink data to the size corresponding to downlink data is lower than or equal to a threshold ratio in operation 903. The condition that makes the size ratio of the size corresponding to uplink data to the size corresponding to downlink data lower than or equal to a threshold ratio may be an example of the condition that associates the uplink data with an ACK or NACK in operation 705 in FIG. 7. The description that the size ratio of the size corresponding to uplink data to the size corresponding to downlink data is lower than or equal to a threshold ratio may mean that transmission of downlink data is relatively being performed mainly, and this may occur in a state in which there is no transmission of uplink data generated by an application executed by the electronic device 101. The threshold ratio may be 1%, for example, but the numerical value is not limited.

When the identified size ratio is less than or equal to the threshold ratio (Yes in operation 903), the electronic device 101 may identify that the condition that associates uplink data with an ACK or NACK is satisfied in operation 905. In this case, the electronic device 101 may transmit uplink data corresponding to the ACK or NACK, based on one of the first RAT or the second RAT, regardless of whether a threshold (for example, ul-DataSplitThreshold) set with regard to dual connectivity is exceeded. When the identified size ratio exceeds the threshold ratio (No in operation 903), the electronic device 101 may identify that the condition that associates uplink data with an ACK or NACK is not satisfied in operation 907. In this case, the electronic device 101 may transmit uplink data, based on a RAT corresponding to a primary path among the first RAT or the second RAT, according to whether the size of uplink data is larger than or equal to a threshold (for example, ul-DataSplitThreshold), or may transmit uplink data by using both the first RAT and the second RAT. For example, when the size of uplink data is larger than or equal to the threshold, the electronic device 101 may transmit uplink data by using both the primary path and the secondary path. For example, when the size of uplink data is less than the threshold, the electronic device 101 may transmit uplink data by using the primary path. As described, in a situation in which downlink data is solely transmitted, excluding the ACK or NACK, the ACK or NACK may be transmitted to a network based on a single RAT, not two RATs, thereby preventing (or reducing) ACK or NACK processing delay. Meanwhile, those skilled in the art will understand that, in addition to the embodiments in FIGS. 8 and 9, any condition that can specify a case in which an ACK or NACK is transmitted may be implemented as the condition that associates uplink data with an ACK or NACK in operation 705 in FIG. 7.

Figure 10:
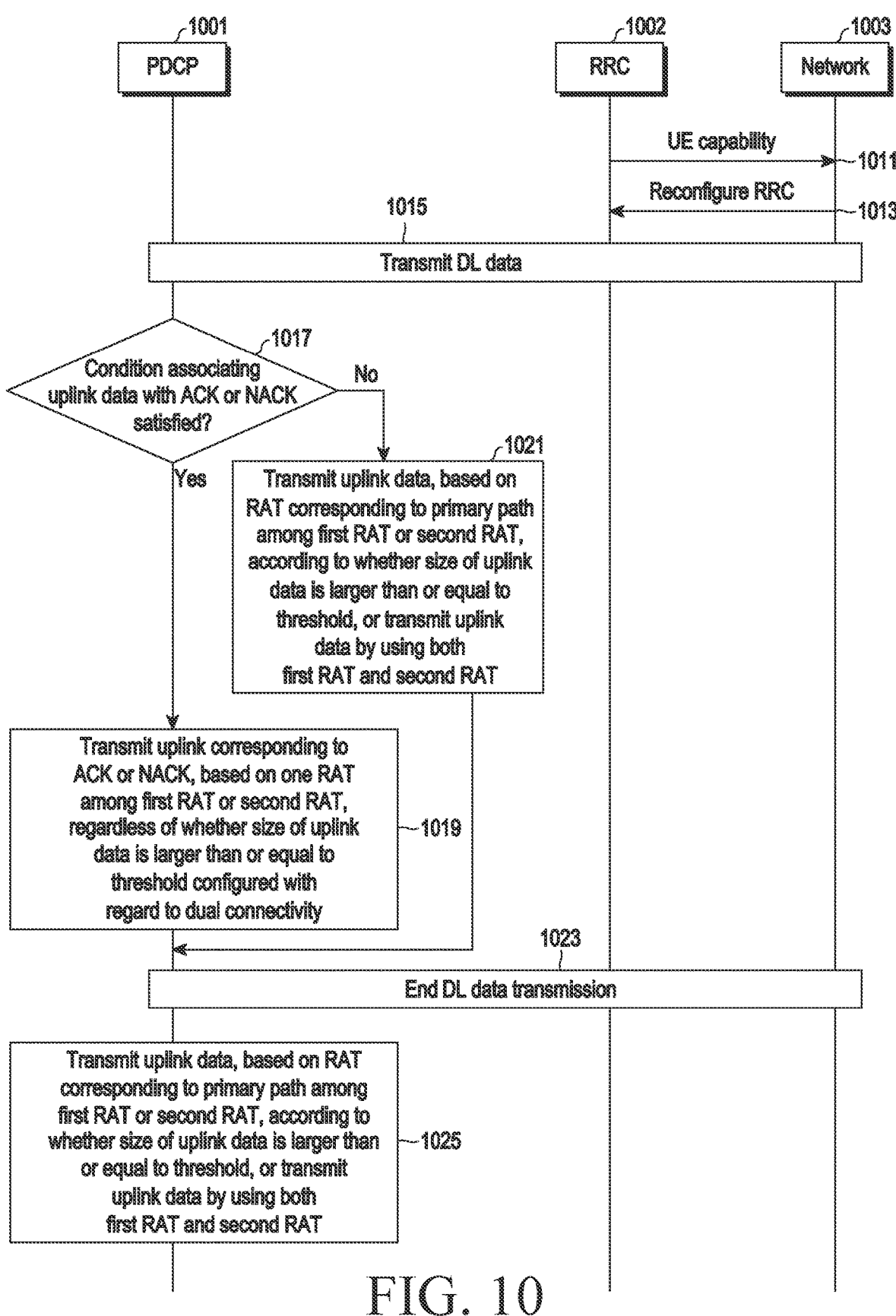
FIG. 10 is a flowchart illustrating a method for operating an electronic device and a network according to an embodiment of the disclosure.

FIG. 10 is a flowchart illustrating a method for operating an electronic device and a network according to an embodiment of the disclosure. The PDCP entity 1001 and the RRC entity 1002 in FIG. 10 may be defined (or executed) by an electronic device 101 according to an embodiment, or operations of the PDCP entity 1001 and the RRC entity 1002 may be performed based on a protocol stack stored in a communication processor (for example, at least one of a first communication processor 212, a second communication processor 214, or an integrated communication processor 260).

According to an embodiment, the RRC entity 1002 may transmit UE capability to a network 1003 in operation 1011. The UE capability may include information (for example, splitDRB-withUL-Both-MCG-SCG: supported (0)) supporting a split bearer, for example. Accordingly, the network 1003 may identify that the electronic device 101 supports the split bearer. The network 1003 may transmit an RRC reconfiguration message to the electronic device 101 in operation 1013. The network 1003 may transmit an RRC reconfiguration message including an uplink split threshold configuration as in Table 1, for example, to the electronic device 101. The network 1003 may transmit downlink data to the electronic device 101 in operation 1015.

According to an embodiment, the PDCP entity 1001 may identify whether a condition that associates uplink data with an ACK or NACK is satisfied in operation 1017. The condition that associates with an ACK or NACK may be the example described with reference to FIGS. 8 and 9, for example, but the example is not limited as described above. In an example, the PDCP entity 1001 may identify whether the condition is satisfied based on the size of a generated PDCP PDU, but may also identify whether the condition is satisfied based on the size of a PDCP SDU, depending on implementation. When the condition that associates with an ACK or NACK is satisfied (Yes in 1017), the PDCP entity 1001 may transmit uplink data corresponding to the ACK or NACK, based on one of a first RAT or a second RAT, regardless of whether the size of uplink data is larger than or equal to a threshold set with regard to dual connectivity in operation 1019. For example, as described in connection with FIG. 5, the PDCP entity 1001 (for example, second PDCP entity 541 in FIG. 5) of the electronic device 101 may determine whether to transmit uplink data through a primary path (or to submit a PDU to an RLC entity corresponding to the primary path), to transmit uplink data through a secondary path (or to submit a PDU to an RLC entity corresponding to the secondary path), or to transmit uplink data through both the primary path and the secondary path (or to submit a PDU to an RLC entity corresponding to the secondary path while submitting a PDU to an RLC entity corresponding to the primary path). The PDCP entity 1001 may submit a PDU to an RLC entity corresponding to one RAT (for example, an RLC entity corresponding to the primary path, or an RLC entity corresponding to the secondary path), regardless of whether the size of uplink data is larger than or equal to a threshold set with regard to connectivity, in operation 1019. In this case, the PDCP entity 1001 may not submit a PDU to both the RLC entity corresponding to the primary path and the RLC entity corresponding to the secondary entity, and uplink data corresponding to an ACK or NACK may be transmitted to the network 1003 based on one RAT, not two RATs.

According to an embodiment, when the condition that associates uplink data with an ACK or NACK is not satisfied (No in 1017), the PDCP entity 1001 may transmit uplink data based on a RAT corresponding to the primary path among the first RAT and the second RAT, according to whether the size of uplink data is larger than or equal to a threshold, or may transmit uplink data by using both the first RAT and the second RAT in operation 1021. For example, when the size of uplink data is larger than or equal to the threshold, the PDCP entity 1001 may submit a PDU both to an RLC entity corresponding to the primary path and to an RLC entity corresponding to the secondary path. For example, when the size of uplink data is less than the threshold, the PDCP entity 1001 may submit a PDU to the RLC entity corresponding tor the primary path.

According to an embodiment, transmission of downlink data from the network 1003 may be ended in operation 1023. The PDCP entity 1001 may transmit uplink data, based on a RAT corresponding to the primary path among the first RAT or the second RAT, according to whether the size of uplink data is larger than or equal to a threshold, or may transmit uplink data by using both the first RAT and the second RAT in operation 1025. For example, when the size of uplink data is larger than or equal to the threshold, the PDCP entity 1001 may submit a PDU both to the RLC entity corresponding to the primary path and the RLC entity corresponding to the secondary path. For example, when the size of uplink data is less than the threshold, the PDCP entity 1001 may submit a PDU to the RLC entity corresponding to the primary path.

Figure 11:
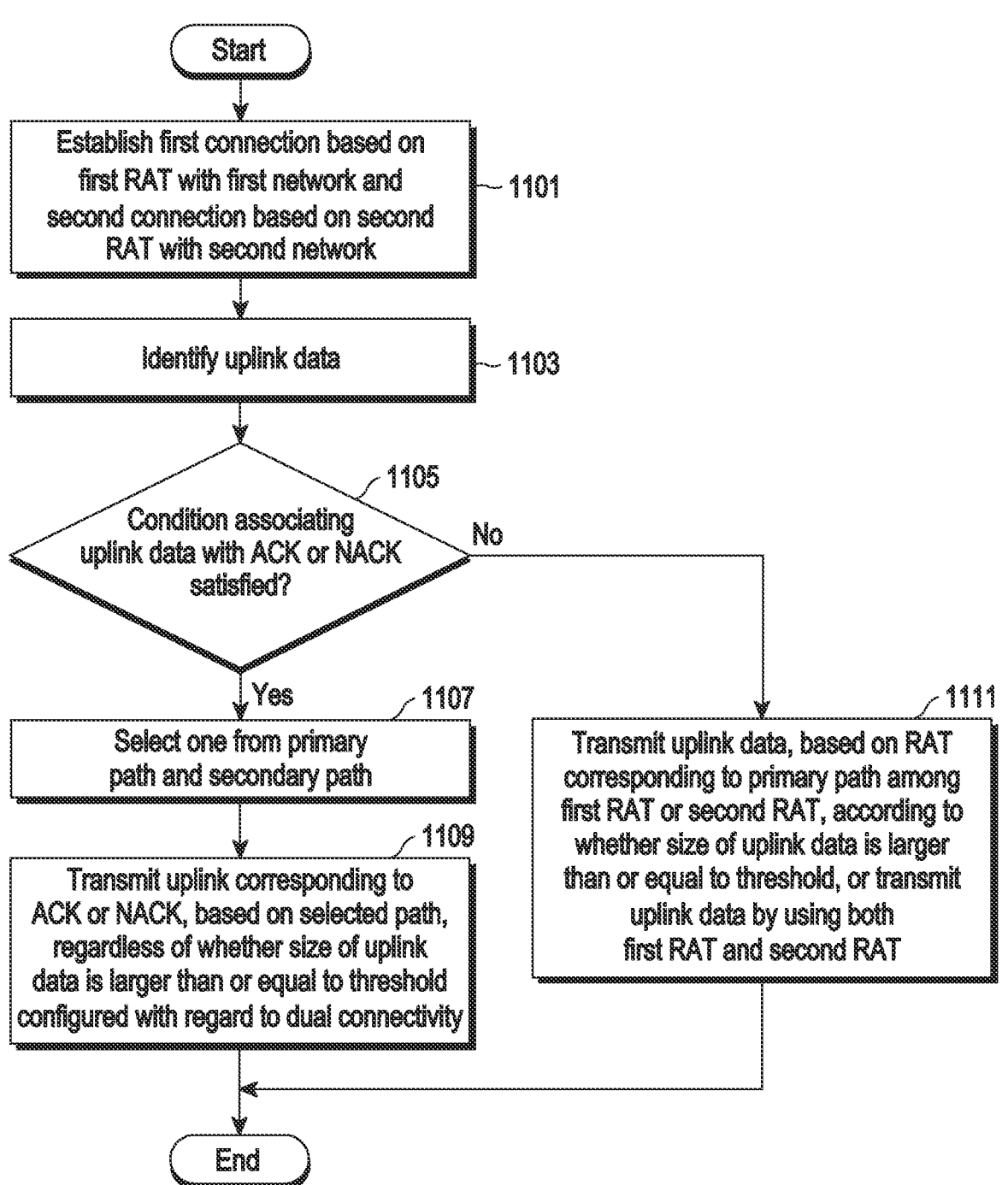
FIG. 11 is a flowchart illustrating a method for operating an electronic device according to an embodiment of the disclosure.

FIG. 11 is a flowchart illustrating a method for operating an electronic device according to an embodiment of the disclosure.

According to an embodiment, an electronic device 101 (for example, at least one of a processor 120, a first communication processor 212, a second communication processor 214, or an integrated communication processor 260) may establish first connection based on a first RAT with a first network and second connection based on a second RAT with a second network in operation 1101. Processes for establishing connections (for example, first and second connections) based on dual connectivity have already been described with reference to FIG. 7, and descriptions thereof will not be repeated herein. In operation 1103, the electronic device 101 may identify uplink data. In operation 1105, the electronic device 101 may identify whether a condition that associates the uplink data with an ACK or NACK is satisfied.

According to an embodiment, if the condition that associates the uplink data with an ACK or NACK is satisfied (Yes in operation 1105), the electronic device 101 may select one from a primary path and a secondary path in operation 1107. The electronic device 101 may select one based on a result of comparing at least one parameter based on the primary path and at least one parameter based on the secondary path, and examples of various parameters will be described later with reference to FIGS. 12A to 12C. Meanwhile, in an embodiment, uplink data may be transmitted through a fixed path when the condition that associates with an ACK or NACK is satisfied, operation 1107 may be omitted in this case, and the fixed path may be the primary path or may be implemented as the secondary path.

According to an embodiment, the electronic device 101 may transmit uplink data corresponding to an ACK or NACK, based on the selected path, regardless of whether the size of uplink data is larger than or equal to a threshold set set regard to dual connectivity in operation 1109. Uplink data corresponding to an ACK or NACK is not transmitted through the path that is not selected, and uplink data may thus be transmitted based on only one RAT, thereby preventing (or reducing) ACK or NACK processing delay. When the condition that associates with an ACK or NACK is not satisfied (No in operation 1105), the electronic device 101 may transmit uplink data, based on a RAT corresponding to the primary path among the first RAT or the second RAT, according to whether the size of uplink data is larger than or equal to the threshold, or may transmit uplink data by using both the first RAT and the second RAT in operation 1111. For example, when the size of uplink data is larger than or equal to the threshold, the electronic device 101 may transmit uplink data by using both the primary path and the secondary path. For example, when the size of uplink data is less than the threshold, the electronic device 101 may transmit uplink data by using the primary path.

As described above, the electronic device 101 may transmit uplink data corresponding to an ACK or NACK, based on one RAT, while downlink data is received, and may again transmit uplink data based on dual connectivity if downlink data reception is over. Meanwhile, the electronic device 101 may be configured to transmit uplink data corresponding to an ACK or NACK, based on one RAT, while executing an application delay prevention (or reduction) of which is important (for example, an application related to a game or URLLC), and to transmit uplink data based on dual connectivity when the corresponding application is not executed. For example, the electronic device 101 may determine whether to transmit uplink data corresponding to an ACK or NACK based on one RAT or to transmit the same based on dual connectivity, according to whether a designated application is executed.

According to an embodiment, the electronic device 101 may perform selection of a RAT (for example, RAT selection in operation 1107) periodically or based on an event. Accordingly, the RAT used to transmit uplink corresponding to an ACK or NACK may be changed according to a channel environment change. For example, in the case of EN-DC, E-UTRA may be selected to transmit uplink corresponding to an ACK or NACK and, according to a channel environment change, NR may be selected to transmit uplink data corresponding to an ACK or NACK, or vice versa.

Figure 12A:
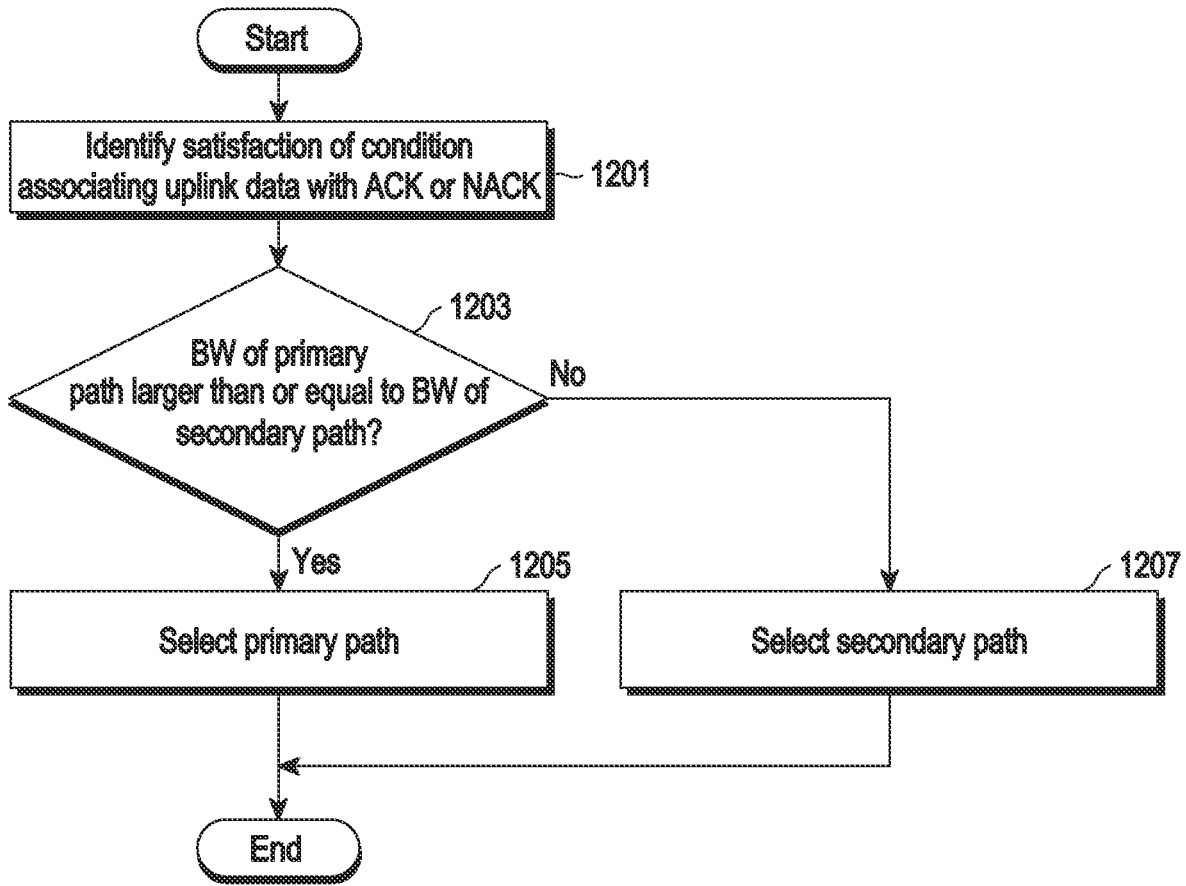
FIG. 12A is a flowchart illustrating a method for operating an electronic device according to an embodiment of the disclosure.

FIG. 12A is a flowchart illustrating a method for operating an electronic device according to an embodiment of the disclosure.

Figure 12B:
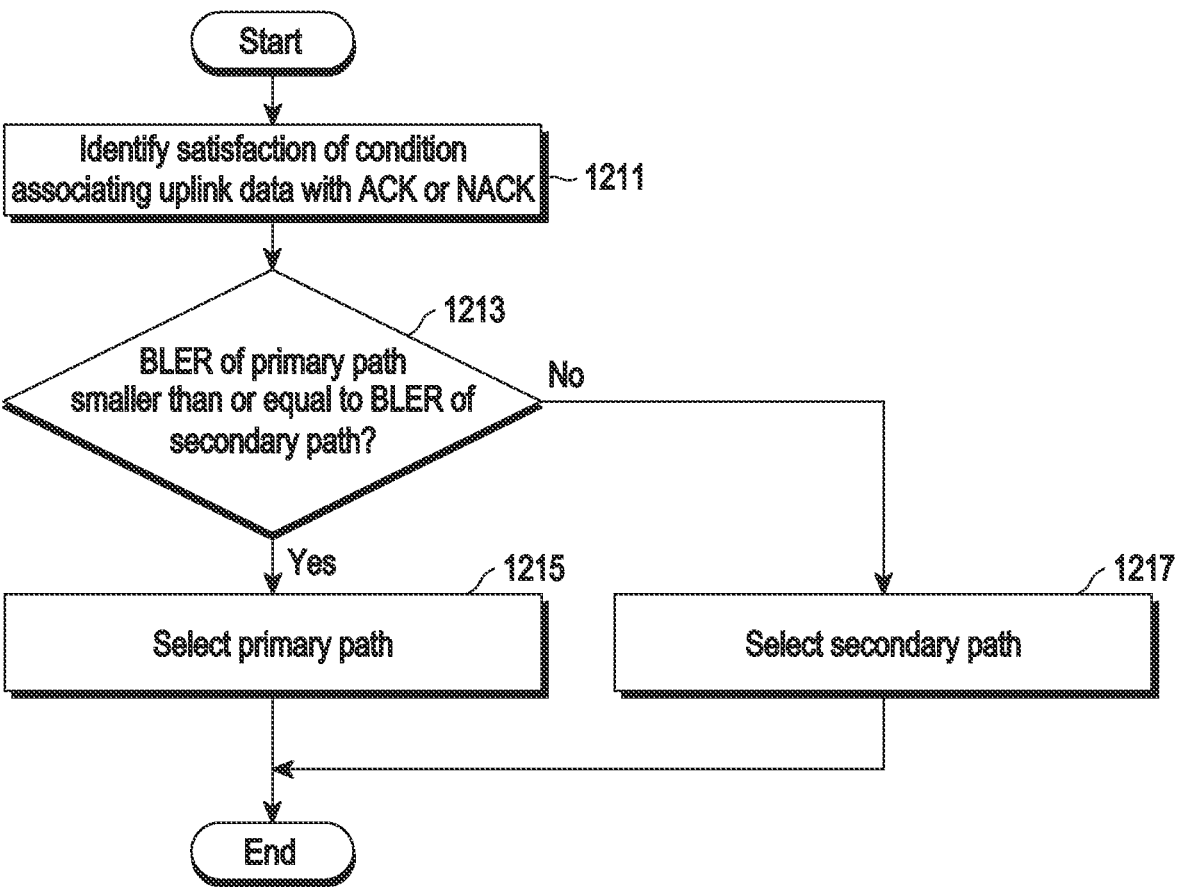
FIG. 12B is a flowchart illustrating a method for operating an electronic device according to an embodiment of the disclosure.
Figure 12C:
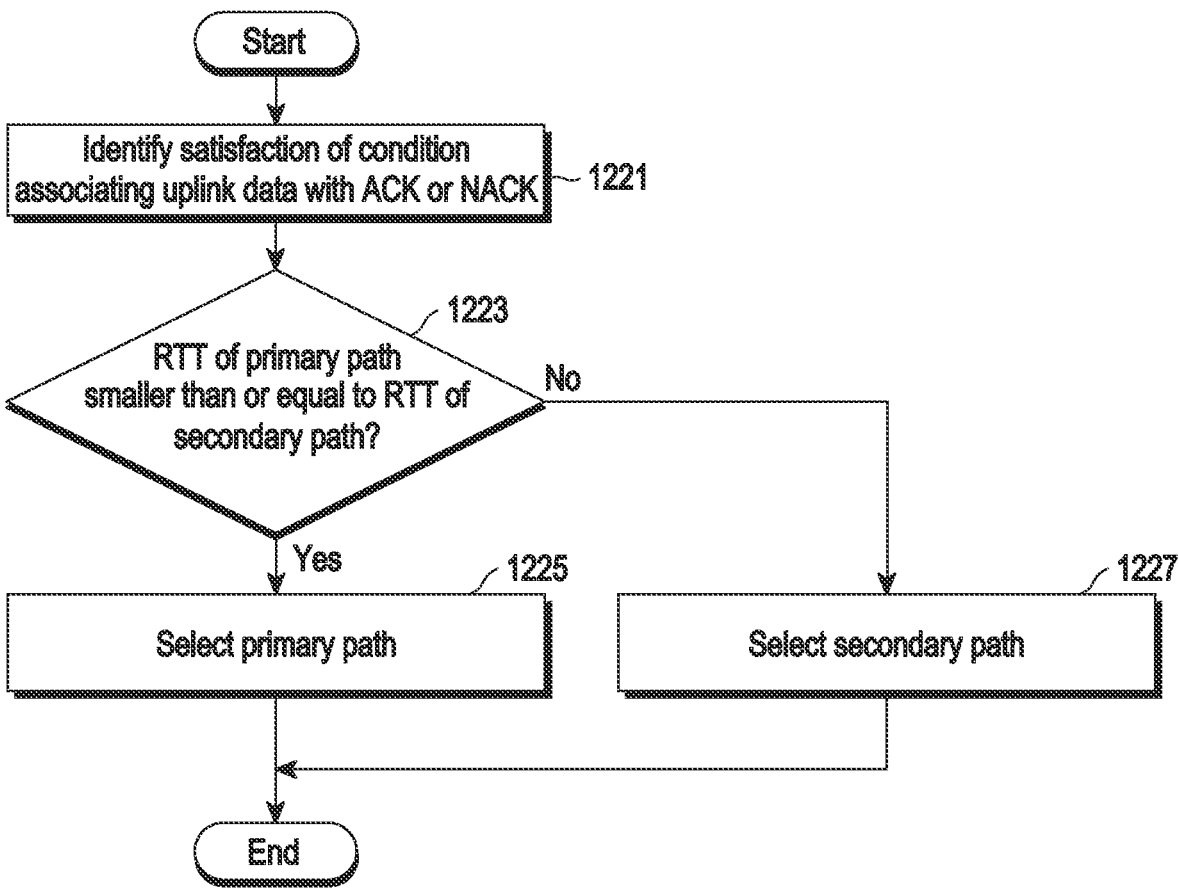
FIG. 12C is a flowchart illustrating a method for operating an electronic device according to an embodiment of the disclosure.

According to an embodiment, an electronic device 101 (for example, at least one of a processor 120, a first communication processor 212, a second communication processor 214, or an integrated communication processor 260) may identify whether a condition that associates uplink data with an ACK or NACK in operation 1201. The condition that associates with an ACK or NACK may be the example described with reference to FIGS. 8 and 9, but the example is not limited as described above. The electronic device 101 may identify whether the bandwidth of a primary path is larger than or equal to the bandwidth of a secondary path in operation 1203. For example, the network may allocate resources to two RATs by using refarming or dynamic spectrum sharing (DSS). The electronic device 101 may compare the bandwidth of the primary path and the bandwidth of the secondary path. Meanwhile, those skilled in the art will understand that reframing or DSS is only an example, and the embodiment in FIGS. 12A to 12C are applicable even to a case in which RATs do not share the operation band at least partially. If the bandwidth of the primary path is larger than or equal to the bandwidth of the secondary path (Yes in operation 1203), the electronic device 101 may select the primary path as a path to transmit uplink data corresponding to an ACK or NACK in operation 1205. If the bandwidth of the primary path is less than the bandwidth of the secondary path (No in operation 1203), the electronic device 101 may select the secondary path as a path to transmit uplink data corresponding to an ACK or NACK in operation 1207. Meanwhile, the condition of operation 1203 that the bandwidth of the primary path is larger than or equal to the bandwidth of the secondary path is only an example, and there is no limit as long as the condition is associated with bandwidths. For example, the condition in operation 1203 may be replaced, for example, with a condition that the bandwidth of the primary path is larger than or equal to the sum of the bandwidth of the secondary path and a threshold bandwidth, and is not limited thereto. As described above, uplink data corresponding to an ACK or NACK may be transmitted through a path having a relatively large bandwidth. Particularly, even when uplink data corresponding to an ACK or NACK is higher than or equal to an uplink split threshold, the same needs to be transmitted based on one RAT as described above, and delay may be prevented (or reduced) by transmitting the same based on a RAT having a relatively larger bandwidth. As described above, depending on the case, uplink data corresponding to an ACK or NACK may be transmitted only through the secondary path, without being transmitted through the primary path.

FIG. 12B is a flowchart illustrating a method for operating an electronic device according to an embodiment of the disclosure.

According to an embodiment, an electronic device 101 (for example, at least one of a processor 120, a first communication processor 212, a second communication processor 214, or an integrated communication processor 260) may identify whether a condition that associates uplink data with an ACK or NACK is satisfied in operation 1211. The condition that associates with an ACK or NACK may be the example described with reference to FIGS. 8 and 9, for example, but the example is not limited as described above. The electronic device 101 may identify whether the block error rate (BLER) of a primary path is lower than or equal to the BLER of a secondary path in operation 1213. If the BLER of the primary path is lower than or equal to the BLER of the secondary path (Yes in operation 1213), the electronic device 101 may select the primary path as a path to transmit uplink data corresponding to an ACK or NACK in operation 1215. If the BLER of the primary path exceeds the BLER of the secondary path (No in operation 1213), the electronic device 101 may select the secondary path as a path to transmit uplink data corresponding to an ACK or NACK in operation 1217. Meanwhile, the condition of operation 1213 that the BLER of the primary path is lower than or equal to the BLER of the secondary path is only an example, and there is no limit as long as the condition is associated with BLERs. For example, the condition in operation 1213 may be replaced, for example, with a condition whether the sum of the BLER of the primary path and a threshold BLER is lower than or equal to the BLER of the secondary path, and is not limited thereto. As described above, uplink data corresponding to an ACK or NACK may be transmitted through a path having a relatively small BLER. Particularly, even when uplink data corresponding to an ACK or NACK is higher than or equal to an uplink split threshold, the same needs to be transmitted based on one RAT as described above, and delay may be prevented (or reduced) by transmitting the same based on a RAT having a relatively smaller BLER. As described above, depending on the case, uplink data corresponding to an ACK or NACK may be transmitted only through the secondary path, without being transmitted through the primary path.

FIG. 12C is a flowchart illustrating a method for operating an electronic device according to an embodiment of the disclosure.

According to an embodiment, an electronic device 101 (for example, at least one of a processor 120, a first communication processor 212, a second communication processor 214, or an integrated communication processor 260) may identify whether a condition that associates uplink data with an ACK or NACK is satisfied in operation 1221. The condition that associates with an ACK or NACK may be the example described with reference to FIGS. 8 and 9, for example, but the example is not limited as described above. The electronic device 101 may identify whether the round trip time (RTT) of a primary path is lower than or equal to the RTT of a secondary path in operation 1223. If the RTT of the primary path is lower than or equal to the RTT of the secondary path (Yes in operation 1223), the electronic device 101 may select the primary path as a path to transmit uplink data corresponding to an ACK or NACK in operation 1225. If the RTT of the primary path exceeds the RTT of the secondary path (No in operation 1223), the electronic device 101 may select the secondary path as a path to transmit uplink data corresponding to an ACK or NACK in operation 1227. Meanwhile, the condition of operation 1223 that the RTT of the primary path is lower than or equal to the RTT of the secondary path is only an example, and there is no limit as long as the condition is associated with RTTs. For example, the condition in operation 1223 may be replaced, for example, with a condition whether the sum of the RTT of the primary path and a threshold RTT is lower than or equal to the RTT of the secondary path, and is not limited thereto. As described above, uplink data corresponding to an ACK or NACK may be transmitted through a path having a relatively small RTT. Particularly, even when uplink data corresponding to an ACK or NACK is higher than or equal to an uplink split threshold, the same needs to be transmitted based on one RAT as described above, and delay may be prevented (or reduced) by transmitting the same based on a RAT having a relatively smaller RTT. As described above, depending on the case, uplink data corresponding to an ACK or NACK may be transmitted only through the secondary path, without being transmitted through the primary path.

Figure 13:
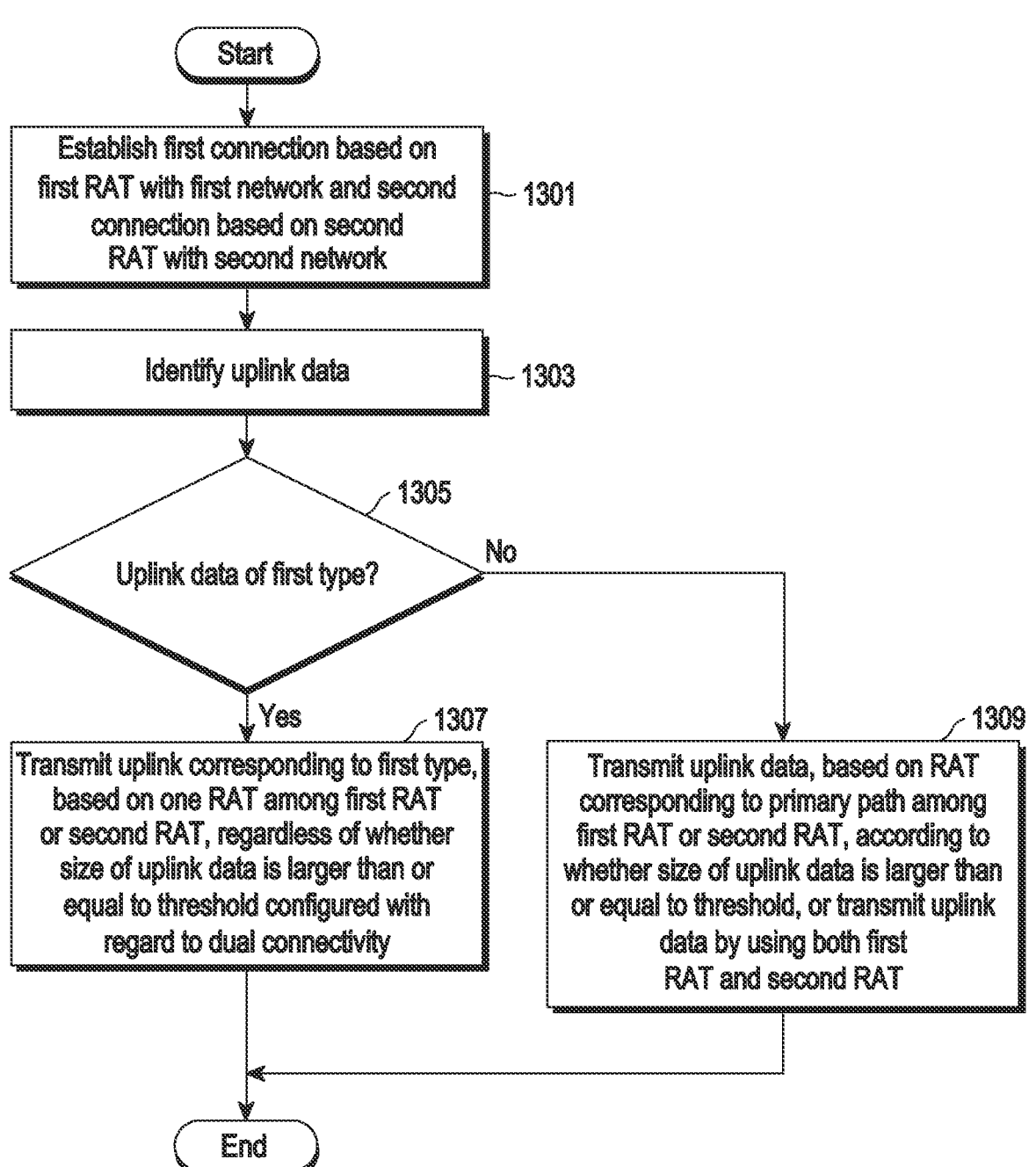
FIG. 13 is a flowchart illustrating a method for operating an electronic device according to an embodiment of the disclosure.

FIG. 13 is a flowchart illustrating a method for operating an electronic device according to an embodiment of the disclosure.

According to an embodiment, an electronic device 101 (for example, at least one of a processor 120, a first communication processor 212, a second communication processor 214, or an integrated communication processor 260) may establish a first connection based on a first RAT with a first network and a second connection based on a second RAT with a second network in operation 1301. The electronic device 101 may identify uplink data in operation 1303. The electronic device 101 may identify whether the uplink data is of a first type in operation 1305. The first type of uplink data may include at least one of uplink data corresponding to an ACK, uplink data corresponding to a NACK, uplink data associated with a PUCCH, uplink data corresponding to a paging response, or uplink data corresponding to a non-access stratum (NAS) message, but the type is not limited thereto. For example, the processing time necessary when the first type of uplink data is transmitted based on one RAT may be shorter than the processing time necessary when the first type of uplink data is transmitted based on two RATs.

According to an embodiment, when the uplink data is of the first type (Yes in operation 1305), the electronic device 101 may transmit the first type of uplink data, based on one of the first RAT or the second RAT, regardless of whether the size of the uplink data is larger than or equal to a threshold (for example, ul-DataSplitThreshold) set with regard to dual connectivity in operation 1307. In this connection, the RAT selected from the first RAT or the second RAT is not limited. For example, a RAT corresponding to the primary path may be selected from the two RATs, a RAT corresponding to the secondary path may be selected from the two RATs, or a RAT may be selected based on a result of comparing parameters related to the two RATs. In this case, even when the size of the first type of uplink data is larger than or equal to the threshold, the first type of uplink data may be transmitted based on only one RAT.

According to an embodiment, when the uplink data is not of the first type (No in operation 1305), the electronic device 101 may transmit the uplink data, based on a RAT corresponding to the primary path among the first RAT or the second RAT, according to whether the size of the uplink data is larger than or equal to a threshold, or may transmit the uplink data by using both the first RAT and the second RAT in operation 1309. For example, when the size of the uplink data is larger than or equal to the threshold, the electronic device 101 may transmit the uplink data by using both the primary path and the secondary path. For example, when the size of the uplink data is less than the threshold, the electronic device 101 may transmit the uplink data by using the primary path.

According to an embodiment, an electronic device (for example, electronic device 101) may include at least one processor (for example, at least one of a processor 120, a first communication processor 212, a second communication processor 214, or an integrated communication processor 260), and the at least one processor may be configured to establish a first connection based on a first radio access technology (RAT) with a first network and a second connection based on a second RAT with a second network, the first connection and the second connection constituting dual connectivity, identify uplink data, based on a condition that associates the uplink data with an ACK or a NACK corresponding to downlink data from the first network or the second network being satisfied, transmit the uplink data corresponding to the ACK or the NACK, based on a RAT among the first RAT or the second RAT, regardless of whether a size of the uplink data is larger than or equal to a threshold set with regard to the dual connectivity, and based on the condition not being satisfied, transmit the uplink data, based on a RAT corresponding to a primary path among the first RAT or the second RAT, according to whether the size of the uplink data is larger than or equal to the threshold, or transmit the uplink data using both the first RAT and the second RAT.

According to an embodiment, the at least one processor may be further configured to identify that the condition is satisfied, based on the size of the uplink data being smaller than or equal to a threshold associated with the ACK or the NACK, and identify that the condition is not satisfied, based on the size of the uplink data exceeding the threshold associated with the ACK or the NACK.

According to an embodiment, the at least one processor may be further configured to identify a ratio of the size of the uplink data to a size of at least one piece of downlink data from the first network or the second network, identify that the condition is satisfied, based on the ratio being smaller than or equal to a threshold ratio, and identify that the condition is not satisfied, based on the ratio exceeding the threshold ratio.

According to an embodiment, the at least one processor may be configured to transmit the uplink data corresponding to the ACK or the NACK on a RAT configured as a primary path among the first RAT and the second RAT, regardless of whether a size of the uplink data is larger than or equal to a threshold set with regard to the dual connectivity, based on the condition being satisfied.

According to an embodiment, the at least one processor may be configured to transmit the uplink data corresponding to the ACK or the NACK on a RAT configured as a secondary path among the first RAT and the second RATregardless of whether a size of the uplink data is larger than or equal to a threshold set with regard to the dual connectivity, based on the condition being satisfied.

According to an embodiment, the at least one processor may be configured to select a RAT among the first RAT or the second RAT and to transmit the uplink data corresponding to the ACK or the NACK, based on the selected RAT regardless of whether a size of the uplink data is larger than or equal to a threshold set with regard to the dual connectivity, based on the condition being satisfied.

According to an embodiment, to select a RAT among the first RAT or the second RAT, the at least one processor may be configured to compare a bandwidth corresponding to the first RAT and a bandwidth corresponding to the second RAT and to select a RAT having a larger bandwidth according to a result of the comparison.

According to an embodiment, to select a RAT among the first RAT or the second RAT, the at least one processor may be configured to compare a BLER corresponding to the first RAT and a BLER corresponding to the second RAT and select a RAT having a smaller BLER according to a result of the comparison.

According to an embodiment, to select a RAT among the first RAT or the second RAT, the at least one processor may be configured to compare a RTT corresponding to the first RAT and a RTT corresponding to the second RAT and select a RAT having a smaller RTT according to a result of the comparison.

According to an embodiment, the at least one processor may be further configured to identify different uplink data, based on the different uplink data satisfying the condition, reselect a RAT for transmitting the different uplink data among the first RAT or the second RAT, and transmit the different uplink data, based on the reselected RAT, and the reselected RAT may be different from the selected RAT.

According to an embodiment, a method for operating an electronic device may include establishing a first connection based on a first radio access technology (RAT) with a first network and a second connection based on a second RAT with a second network, the first connection and the second connection constituting dual connectivity, identifying uplink data, based on a condition that associates the uplink data with an ACK or a NACK corresponding to downlink data from the first network or the second network being satisfied, transmitting the uplink data corresponding to the ACK or the NACK, based on a RAT among the first RAT or the second RAT, regardless of whether a size of the uplink data is larger than or equal to a threshold set with regard to the dual connectivity, and based on the condition not being satisfied, transmitting the uplink data, based on a RAT corresponding to a primary path among the first RAT or the second RAT, according to whether the size of the uplink data is larger than or equal to the threshold, or transmitting the uplink data using both the first RAT and the second RAT.

According to an embodiment, the method may further include identifying that the condition is satisfied, based on the size of the uplink data being smaller than or equal to a threshold associated with the ACK or the NACK, and identifying that the condition is not satisfied, based on the size of the uplink data exceeding the threshold associated with the ACK or the NACK.

According to an embodiment, the method may further include identifying a ratio of the size of the uplink data to a size of at least one piece of downlink data from the first network or the second network, identifying that the condition is satisfied, based on the ratio being smaller than or equal to a threshold ratio, and identifying that the condition is not satisfied, based on the ratio exceeding the threshold ratio.

According to an embodiment, in the transmitting of the uplink data corresponding to the ACK or the NACK, based on a RAT among the first RAT or the second RAT, regardless of whether a size of the uplink data is larger than or equal to a threshold set with regard to the dual connectivity, based on the condition being satisfied, the uplink data corresponding to the ACK or the NACK may be transmitted, based on a RAT configured as a primary path among the first RAT and the second RAT.

According to an embodiment, in the transmitting of the uplink data corresponding to the ACK or the NACK, based on a RAT among the first RAT or the second RAT, regardless of whether a size of the uplink data is larger than or equal to a threshold set with regard to the dual connectivity, based on the condition being satisfied, the uplink data corresponding to the ACK or the NACK may be transmitted, based on a RAT configured as a secondary path among the first RAT and the second RAT.

According to an embodiment, the transmitting of the uplink data corresponding to the ACK or the NACK, based on a RAT among the first RAT or the second RAT, regardless of whether a size of the uplink data is larger than or equal to a threshold set with regard to the dual connectivity, based on the condition being satisfied, may include selecting a RAT among the first RAT or the second RAT, and transmitting the uplink data corresponding to the ACK or the NACK, based on the selected RAT.

According to an embodiment, the selecting of a RAT among the first RAT or the second RAT may include comparing a bandwidth corresponding to the first RAT and a bandwidth corresponding to the second RAT, and selecting a RAT having a larger bandwidth according to a result of the comparing.

According to an embodiment, the selecting of a RAT among the first RAT or the second RAT may include comparing a BLER corresponding to the first RAT and a BLER corresponding to the second RAT, and selecting a RAT having a smaller BLER according to a result of the comparing.

According to an embodiment, the selecting of a RAT among the first RAT or the second RAT may include comparing a RTT corresponding to the first RAT and a RTT corresponding to the second RAT, and selecting a RAT having a smaller RTT according to a result of the comparing.

According to an embodiment, an electronic device may include at least one processor, and the at least one processor may be configured to establish a first connection based on a first radio access technology (RAT) with a first network and a second connection based on a second RAT with a second network, the first connection and the second connection constituting dual connectivity, identify uplink data, based on the uplink data being of a first type, transmit the uplink data, based on a RAT among the first RAT or the second RAT, regardless of whether a size of the uplink data is larger than or equal to a threshold set with regard to the dual connectivity, and based on the uplink data not being of the first type, transmit the uplink data, based on a RAT corresponding to a primary path among the first RAT or the second RAT, according to whether the size of the uplink data is larger than or equal to the threshold, or transmit the uplink data using both the first RAT and the second RAT.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
memory storing instructions; and
one or more processors communicatively coupled to the memory,
wherein the instructions, when executed by the one or more processors individually or collectively, cause the electronic device to:
establish a first connection based on a first radio access technology (RAT) with a first network and a second connection based on a second RAT with a second network, the first connection and the second connection constituting dual connectivity,
identify uplink data,
identify whether a size of the uplink data is larger than a first threshold related to split bearer in the dual connectivity,
based on the identification that the size of the uplink data is larger than the first threshold:
identify whether the size of the uplink data is larger than a second threshold associated with an acknowledgment (ACK) or a negative acknowledgment (NACK); and
transmit the uplink data using one of the first RAT or the second RAT, when the size of the uplink data is equal to or smaller than the second threshold; or transmit the uplink data using both the first RAT and the second RAT, when the size of the uplink data is larger than the second threshold, and
based on the identification that the size of the uplink data is equal to or smaller than the first threshold:
transmit the uplink data using one of the first RAT or the second RAT.

2. The electronic device of claim 1, wherein the instructions, when executed by the one or more processors individually or collectively, further cause the electronic device to:
identify that a condition associating the uplink data with the ACK or the NACK corresponding to downlink data from the first network or the second network is satisfied, based on the size of the uplink data being smaller than or equal to a threshold associated with the ACK or the NACK, and
identify that the condition is not satisfied, based on the size of the uplink data exceeding the threshold associated with the ACK or the NACK.

3. The electronic device of claim 1, wherein the instructions, when executed by the one or more processors individually or collectively, further cause the electronic device to:
identify a ratio of the size of the uplink data to a size of at least one piece of downlink data from the first network or the second network,
identify that a condition associating the uplink data with the ACK or the NACK corresponding to downlink data from the first network or the second network is satisfied, based on the ratio being smaller than or equal to a threshold ratio, and
identify that the condition is not satisfied, based on the ratio exceeding the threshold ratio.

4. The electronic device of claim 1, wherein the instructions, when executed by the one or more processors individually or collectively, further cause the electronic device to:
based on a condition associating the uplink data with the ACK or the NACK corresponding to downlink data from the first network or the second network being satisfied, set a RAT configured as a primary path among the first RAT and the second RAT as the RAT among the first RAT or the second RAT for transmitting the uplink data corresponding to the ACK or the NACK.

5. The electronic device of claim 1, wherein the instructions, when executed by the one or more processors individually or collectively, further cause the electronic device to:
based on a condition associating the uplink data with the ACK or the NACK corresponding to downlink data from the first network or the second network being satisfied, set a RAT configured as a secondary path among the first RAT and the second RAT as the RAT among the first RAT or the second RAT for transmitting the uplink data corresponding to the ACK or the NACK.

6. The electronic device of claim 1, wherein, based on a condition associating the uplink data with the ACK or the NACK corresponding to downlink data from the first network or the second network being satisfied, the instructions, when executed by the one or more processors individually or collectively, further cause the electronic device to:
select an RAT among the first RAT or the second RAT, and
set the selected RAT as the RAT among the first RAT or the second RAT for transmitting the uplink data corresponding to the ACK or the NACK.

7. The electronic device of claim 6, wherein, to select the RAT among the first RAT or the second RAT, the instructions, when executed by the one or more processors individually or collectively, further cause the electronic device to:

compare a bandwidth corresponding to the first RAT and a bandwidth corresponding to the second RAT, and select an RAT having a larger bandwidth according to a result of the comparison.

8. The electronic device of claim 6, wherein, to select the RAT among the first RAT or the second RAT, the instructions, when executed by the one or more processors individually or collectively, further cause the electronic device to:

compare a block error rate (BLER) corresponding to the first RAT and a BLER corresponding to the second RAT, and select an RAT having a smaller BLER according to a result of the comparison.

9. The electronic device of claim 6, wherein, to select the RAT among the first RAT or the second RAT, the instructions, when executed by the one or more processors individually or collectively, further cause the electronic device to:

compare a round trip time (RTT) corresponding to the first RAT and an RTT corresponding to the second RAT, and select an RAT having a smaller RTT according to a result of the comparison.

10. The electronic device of claim 6, wherein the instructions, when executed by the one or more processors individually or collectively, further cause the electronic device to:

identify different uplink data, based on the different uplink data satisfying the condition:

reselect an RAT for transmitting the different uplink data among the first RAT or the second RAT, and transmit the different uplink data, based on the reselected RAT, and wherein the reselected RAT is different from the selected RAT.

11. A method performed by an electronic device, the method comprising:

establishing a first connection based on a first radio access technology (RAT) with a first network and a second connection based on a second RAT with a second network, the first connection and the second connection constituting dual connectivity;

identifying uplink data;

identifying whether a size of the uplink data is larger than a first threshold related to split bearer in the dual connectivity;

based on the identification that the size of the uplink data is larger than the first threshold:

identifying whether the size of the uplink data is larger than a second threshold associated with an acknowledgment (ACK) or a negative acknowledgment (NACK), and transmitting the uplink data using one of the first RAT or the second RAT, when the size of the uplink data is equal to or smaller than the second threshold, or transmitting the uplink data using both the first RAT and the second RA, when the size of the uplink data is larger than the second threshold; and based on the identification that the size of the uplink data is equal to or smaller than the first threshold:

transmitting the uplink data using one of the first RAT or the second RAT.

12. The method of claim 11, further comprising:

identifying that a condition associating the uplink data with the ACK or the NACK corresponding to downlink data from the first network or the second network is satisfied, based on the size of the uplink data being smaller than or equal to a threshold associated with the ACK or the NACK; and identifying that the condition is not satisfied, based on the size of the uplink data exceeding the threshold associated with the ACK or the NACK.

13. The method of claim 11, further comprising:

identifying a ratio of the size of the uplink data to a size of at least one piece of downlink data from the first network or the second network;

identifying that a condition associating the uplink data with the ACK or the NACK corresponding to downlink data from the first network or the second network is satisfied, based on the ratio being smaller than or equal to a threshold ratio; and identifying that the condition is not satisfied, based on the ratio exceeding the threshold ratio.

14. The method of claim 11, further comprising:

based on a condition associating the uplink data with the ACK or the NACK corresponding to downlink data from the first network or the second network being satisfied, transmitting the uplink data corresponding to the ACK or the NACK based on an RAT configured as a primary path among the first RAT and the second RAT.

15. The method of claim 11, further comprising:

based on a condition associating the uplink data with the ACK or the NACK corresponding to downlink data from the first network or the second network being satisfied, transmitting the uplink data corresponding to the ACK or the NACK based on an RAT configured as a secondary path among the first RAT and the second RAT.

16. The method of claim 11, further comprising:

based on a condition associating the uplink data with the ACK or the NACK corresponding to downlink data from the first network or the second network being satisfied:

selecting an RAT among the first RAT or the second RAT; and transmitting the uplink data corresponding to the ACK or the NACK, based on the selected RAT.

17. The method of claim 16, wherein the selecting of the RAT among the first RAT or the second RAT comprises:

comparing a bandwidth corresponding to the first RAT and a bandwidth corresponding to the second RAT; and selecting an RAT having a larger bandwidth according to a result of the comparing.

18. The method of claim 16, wherein the selecting of the RAT among the first RAT or the second RAT comprises:

comparing a block error rate (BLER) corresponding to the first RAT and a BLER corresponding to the second RAT; and selecting an RAT having a smaller BLER according to a result of the comparing.

19. The method of claim 16, wherein the selecting of the RAT among the first RAT or the second RAT comprises:

comparing a round trip time (RTT) corresponding to the first RAT and an RTT corresponding to the second RAT; and selecting an RAT having a smaller RTT according to a result of the comparing.

20. One or more non-transitory computer-readable storage media storing one or more computer programs including computer-executable instructions that, when executed by one or more processors of an electronic device individually or collectively, cause the electronic device to perform operations, the operations comprising:

establishing a first connection based on a first radio access technology (RAT) with a first network and a second connection based on a second RAT with a second network, the first connection and the second connection constituting dual connectivity;

identifying uplink data;

identifying whether a size of the uplink data is larger than a first threshold related to split bearer in dual connectivity;

based on the identification that the size of the uplink data is larger than the first threshold:

identifying whether the size of the uplink data is larger than a second threshold associated with an acknowledgement (ACK) or a negative acknowledgement (NACK), and transmitting the uplink data using one of the first RAT or the second RAT, when the size of the uplink data is equal to or smaller than the second threshold, or transmitting the uplink data using both the first RAT and the second RAT, when the size of the uplink data is larger than the second threshold; and based on the identification that the size of the uplink data is equal to or smaller than the first threshold:

transmitting the uplink data using one of the first RAT or the second RAT.

* * * * *